US012512957B2

(12) United States Patent
Khayatzadeh et al.

(10) Patent No.: US 12,512,957 B2
(45) Date of Patent: Dec. 30, 2025

(54) ELECTRONIC DEVICES WITH OPTICAL SELF-INJECTION LOOPS

(71) Applicant: Apple Inc., Cupertino, CA (US)

(72) Inventors: Ramin Khayatzadeh, Munich (DE); Nedim Muharemovic, Nuremberg (DE); Bertram R Gunzelmann, Koenigsbrunn (DE); Zdravko Boos, Munich (DE)

(73) Assignee: Apple Inc., Cupertino, CA (US)

( * ) Notice: Subject to any disclaimer, the term of this patent is extended or adjusted under 35 U.S.C. 154(b) by 305 days.

(21) Appl. No.: 18/320,540

(22) Filed: May 19, 2023

(65) Prior Publication Data

US 2023/0421346 A1   Dec. 28, 2023

Related U.S. Application Data

(60) Provisional application No. 63/354,594, filed on Jun. 22, 2022.

(51) Int. Cl.
*H04B 10/516*   (2013.01)
*H04B 10/2575*   (2013.01)
*H04L 7/00*   (2006.01)

(52) U.S. Cl.
CPC ..... *H04L 7/0075* (2013.01); *H04B 10/25752* (2013.01); *H04B 10/5165* (2013.01); *H04B 2210/006* (2013.01)

(58) Field of Classification Search
CPC .......... H04B 10/25752; H04B 10/5165; H04B 2210/006

(Continued)

(56) References Cited

U.S. PATENT DOCUMENTS

2013/0221211 A1* 8/2013 Witzens ............... H04B 10/60
250/216
2013/0301664 A1* 11/2013 Prather ............... G02F 2/002
372/28

(Continued)

OTHER PUBLICATIONS

Chen et al: "Synchronized Narrow Linewidth Laser and High Quality Microwave Signal Generation using Optically Mutual-Injection-Locked DFB Lasers with Optoelectronic Feedback", CLEO 2018, May 13-18, 2018, paper No. SW4Q.6 (Year: 2018).*

(Continued)

*Primary Examiner* — Li Liu
(74) *Attorney, Agent, or Firm* — Treyz Law Group, P.C.; Michael H. Lyons

(57) ABSTRACT

An electronic device may include wireless circuitry that conveys radio-frequency signals at frequencies greater than or equal to 100 GHz using first and second optical local oscillator (LO) signals generated by clocking circuitry. The clocking circuitry may include a first laser that generates the first optical LO signal and a second laser that generates the second optical LO signal. First and second self-injection locking loop paths may be coupled around the first and second lasers respectively. The first loop path may include a first mixer, an optical reference, and a second mixer. The second loop path may include a photodiode, the first mixer, and the optical reference. The photodiode may provide a radio-frequency signal to the mixers. The optical reference may include an optical delay line or resonator and may reduce phase noise of optical signals used to self-injection lock the first and second lasers.

20 Claims, 12 Drawing Sheets

(58) Field of Classification Search
USPC .................................................. 398/115, 201
See application file for complete search history.

(56) References Cited

U.S. PATENT DOCUMENTS

2017/0003524 A1* 1/2017 Schaefer ............ H04B 10/2575
2022/0021454 A1* 1/2022 Maleki .................. H04B 10/00
2022/0190920 A1* 6/2022 El Amili .......... H04B 10/25758

OTHER PUBLICATIONS

Goetz et al: "InP-Based MMIC Components for an Optical Phase-Locked Loop", IEEE Transactions on Microwave Theory and Techniques, vol. 47, Issue 7, Jul. 1999, pp. 1241-1250 (Year: 1999).*
Aliou LY et al., Highly Spectrally Pure 90-GHz Signal Synthesis Using a Coupled Optoelectronic Oscillator, IEEE Photonics Technology Letters, Jul. 15, 2018, pp. 1313-1316, vol. 30, No. 14, IEEE.
X. Steve Yao et al., Coupled Opto-Electronic Oscillators, 1998 IEEE International Frequency Control Symposium, May 29, 1998, pp. 540-544, IEEE, Pasadena, CA, USA.
Guangcan Chen et al., Frequency-tunable Optoelectronic Oscillator With Synchronized Dual-Wavelength Narrow-Linewidth Laser Output, IEEE Access, Nov. 6, 2018, pp. 69224-69229, vol. 6, IEEE.
Mohamed Hussein Eissa et al., A 13.5-dBm 200-255-GHz 4-Way Power Amplifier and Frequency Source in 130-nm BiCMOS, IEEE Solid-State Circuits Letters, Nov. 5, 2019, pp. 268-271, vol. 2, No. 11, IEEE.

* cited by examiner

ELECTRONIC DEVICES WITH OPTICAL SELF-INJECTION LOOPS

This application claims the benefit of U.S. Provisional Patent Application No. 63/354,594, filed Jun. 22, 2022, which is hereby incorporated by reference herein in its entirety.

FIELD

This disclosure relates generally to electronic devices and, more particularly, to electronic devices with wireless circuitry.

BACKGROUND

Electronic devices can be provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. As communication frequencies increase, it can become difficult to provide low phase noise clocking for the wireless circuitry.

SUMMARY

An electronic device may include wireless circuitry that conveys wireless signals at frequencies greater than 100 GHz. The wireless circuitry or other circuitry in the device may be clocked using clocking circuitry. The clocking circuitry may include a primary laser that emits a first optical local oscillator (LO) signal at a fixed first frequency and a secondary laser that emits a second optical LO signal at a second frequency. The wireless circuitry may, for example, convey the wireless signals using the first and second optical LO signals.

The clocking circuitry may include a first self-injection locking loop path around the first laser and a second self-injection locking loop path around the second laser. The clocking circuitry may include a photodiode that forms part of the second self-injection locking loop path. The clocking circuitry may include a first electro-optical mixer that forms part of both the first and second self-injection locking loop paths. The clocking circuitry may include an optical reference that forms part of both the first and second self-injection locking loop paths. The first self-injection locking loop path may include a second electro-optical mixer. If desired, an additional optical reference may be disposed on the first self-injection locking loop path but not the second self-injection locking loop path. Each optical reference may include an optical delay line or an optical resonator, for example.

The photodiode may generate a radio-frequency signal based on the first and second optical LO signals. The first electro-optical mixer may generate a first optical signal based on the first optical LO signal and the radio-frequency signal. The optical reference may reduce phase noise of the first optical signal. The second electro-optical mixer may generate a second optical signal based on the first optical LO signal (e.g., after phase noise reduction by the optical reference) and the radio-frequency signal. The first and second electro-optical mixers may, for example, perform single sideband carrier suppression on opposite sidebands for their respective optical signals. The second laser may be self-injection locked using the first optical signal. The first laser may be self-injection locked using the second optical signal. This may serve to minimize phase noise in the clocking circuitry.

An aspect of the disclosure provides clocking circuitry. The clocking circuitry may include a first light source configured to generate a first optical local oscillator (LO) signal at a first frequency. The clocking circuitry may include a second light source configured to generate a second optical LO signal at a second frequency. The clocking circuitry may include a photodiode configured to be illuminated by the first optical LO signal and the second optical LO signal. The clocking circuitry may include a mixer having a first input coupled to the first light source and a second input coupled to the photodiode. The clocking circuitry may include an optical path that couples an output of the optical mixer to an input of the second light source. The clocking circuitry may include an optical reference disposed on the optical path.

An aspect of the disclosure provides clocking circuitry. The clocking circuitry may include a first laser configured to generate a first optical local oscillator (LO) signal. The clocking circuitry may include a second laser configured to generate a second optical LO signal. The clocking circuitry may include a first self-injection locking loop path coupled around the first laser and configured to self-injection lock the first laser. The clocking circuitry may include a second self-injection locking loop path coupled around the second laser and configured to self-injection lock the second laser. The clocking circuitry may include an optical reference that forms a part of both the first self-injection locking loop path and the second self-injection locking loop path.

An aspect of the disclosure provides an electronic device. The electronic device may include a first laser configured to emit a first optical local oscillator (LO) signal. The electronic device may include a second laser configured to emit a second optical LO signal. The electronic device may include an antenna configured to convey radio-frequency signals based on the first optical LO signal and the second optical LO signal. The electronic device may include a photodiode configured to be illuminated by the first optical LO signal and the second optical LO signal. The electronic device may include a first loop path coupled between an output of the first laser and an input of the first laser. The electronic device may include a second loop path coupled between an output of the second laser and an input of the second laser, the photodiode being disposed on the second loop path. The electronic device may include a first mixer disposed on the first loop path and the second loop path. The electronic device may include a second mixer disposed on the first loop path. The electronic device may include an optical reference disposed on the first loop path between the first mixer and the second mixer and on the second loop path between the first mixer and the second laser.

DETAILED DESCRIPTION

Figure 1:
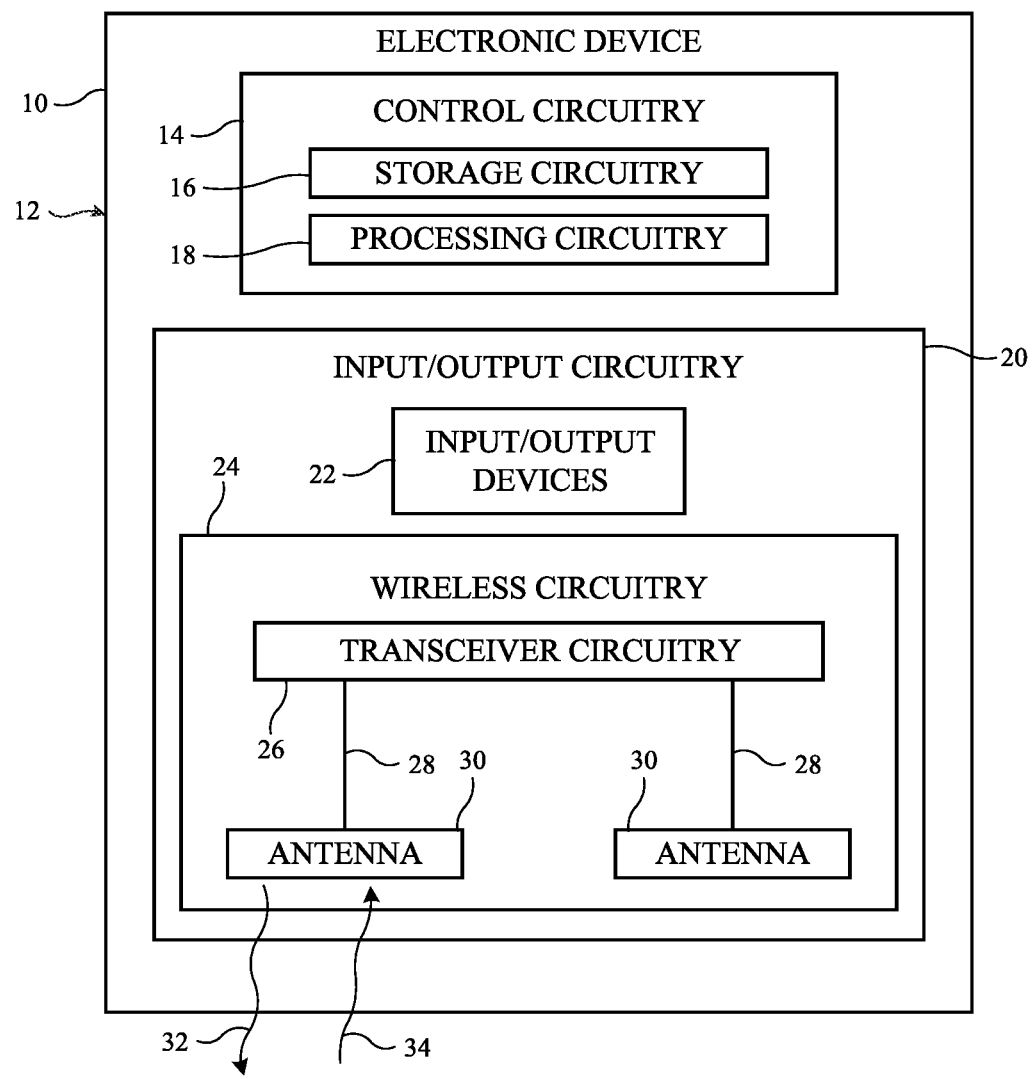
FIG. 1 is a block diagram of an illustrative electronic device having wireless circuitry with at least one antenna that conveys wireless signals at frequencies greater than about 100 GHz in accordance with some embodiments.

Electronic device 10 of FIG. 1 (sometimes referred to herein as electro-optical device 10) may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas 30. Wireless circuitry 24 may also include transceiver circuitry 26. Transceiver circuitry 26 may include transmitter circuitry, receiver circuitry, modulator circuitry, demodulator circuitry (e.g., one or more modems), radio-frequency circuitry, one or more radios, intermediate frequency circuitry, optical transmitter circuitry, optical receiver circuitry, optical light sources, other optical components, baseband circuitry (e.g., one or more baseband processors), amplifier circuitry, clocking circuitry such as one or more local oscillators and/or phase-locked loops, memory, one or more registers, filter circuitry, switching circuitry, analog-to-digital converter (ADC) circuitry, digital-to-analog converter (DAC) circuitry, radio-frequency transmission lines, optical fibers, and/or any other circuitry for transmitting and/or receiving wireless signals using antennas 30. The components of transceiver circuitry 26 may be implemented on one integrated circuit, chip, system-on-chip (SOC), die, printed circuit board, substrate, or package, or the components of transceiver circuitry 26 may be distributed across two or more integrated circuits, chips, SOCs, printed circuit boards, substrates, and/or packages.

The example of FIG. 1 is illustrative and non-limiting. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of wireless circuitry 24. The baseband circuitry may, for example, access a communication protocol stack on control circuitry 14 (e.g., storage circuitry 20) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

Transceiver circuitry 26 may be coupled to each antenna 30 in wireless circuitry 24 over a respective signal path 28. Each signal path 28 may include one or more radio-frequency transmission lines, waveguides, optical fibers, and/or any other desired lines/paths for conveying wireless signals between transceiver circuitry 26 and antenna 30. Antennas 30 may be formed using any desired antenna structures for conveying wireless signals. For example, antennas 30 may include antennas with resonating elements that are formed from dipole antenna structures, planar dipole antenna structures (e.g., bowtie antenna structures), slot antenna structures, loop antenna structures, patch antenna structures, inverted-F antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time.

If desired, two or more of antennas 30 may be integrated into a phased antenna array (sometimes referred to herein as a phased array antenna) in which each of the antennas conveys wireless signals with a respective phase and magnitude that is adjusted over time so the wireless signals constructively and destructively interfere to produce (form) a signal beam in a given pointing direction. The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between device 10 and external wireless communications equipment (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc.

Wireless circuitry 24 may transmit and/or receive wireless signals within corresponding frequency bands of the electromagnetic spectrum (sometimes referred to herein as communications bands or simply as "bands"). The frequency bands handled by communications circuitry 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between and 60 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-Gbps or higher, wireless circuitry 24 may convey wireless signals at frequencies greater than 100 GHz.

As shown in FIG. 1, wireless circuitry 24 may transmit wireless signals 32 and may receive wireless signals 34 at frequencies greater than around 100 GHz. Wireless signals 32 and 34 may sometimes be referred to herein as tremendously high frequency (THF) signals 32 and 34, sub-THz signals 32 and 34, THz signals 32 and 34, or sub-millimeter wave signals 32 and 34. THF signals 32 and 34 may be at sub-THz or THz frequencies such as frequencies between 100 GHz and 1 THz, between 100 GHz and 10 THz, between 100 GHz and 2 THz, between 200 GHz and 1 THz, between 300 GHz and 1 THz, between 300 GHz and 2 THz, between 300 GHz and 10 THz, between 100 GHz and 800 GHz, between 200 GHz and 1.5 THz, etc. (e.g., within a sub-THz, THz, THF, or sub-millimeter frequency band such as a 6G frequency band). The high data rates supported by these frequencies may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals 32 to another antenna 30 on a second chip in device 10), and/or to perform any other desired high data rate operations.

Space is at a premium within electronic devices such as device 10. In some scenarios, different antennas 30 are used to transmit THF signals 32 than are used to receive THF signals 34. However, handling transmission of THF signals 32 and reception of THF signals 34 using different antennas 30 can consume an excessive amount of space and other resources within device 10 because two antennas 30 and signal paths 28 would be required to handle both transmission and reception. To minimize space and resource consumption within device 10, the same antenna 30 and signal path 28 may be used to both transmit THF signals 32 and to receive THF signals 34. If desired, multiple antennas 30 in wireless circuitry 24 may transmit THF signals 32 and may receive THF signals 34. The antennas may be integrated into a phased antenna array that transmits THF signals 32 and that receives THF signals 34 within a corresponding signal beam oriented in a selected beam pointing direction.

It can be challenging to incorporate components into wireless circuitry 24 that support wireless communications at these high frequencies. If desired, transceiver circuitry 26 and signal paths 28 may include optical components that convey optical signals to support the transmission of THF signals 32 and the reception of THF signals 34 in a space and resource-efficient manner. The optical signals may be used in transmitting THF signals 32 at THF frequencies and in receiving THF signals 34 at THF frequencies.

Figure 2:
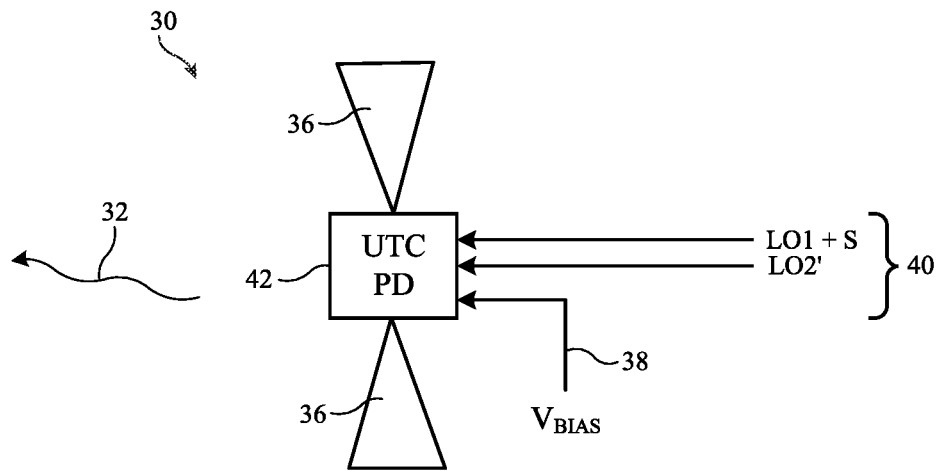
FIG. 2 is a top view of an illustrative antenna that transmits wireless signals at frequencies greater than about 100 GHz based on optical local oscillator (LO) signals in accordance with some embodiments.

FIG. 2 is a diagram of an illustrative antenna 30 that may be used to both transmit THF signals 32 and to receive THF signals 34 using optical signals. Antenna 30 may include one or more antenna radiating (resonating) elements such as radiating (resonating) element arms 36. In the example of FIG. 2, antenna 30 is a planar dipole antenna (sometimes referred to as a "bowtie" antenna) having two opposing radiating element arms 36 (e.g., bowtie arms or dipole arms). This is illustrative and non-limiting. In general, antenna 30 may be any type of antenna having any desired antenna radiating element architecture.

As shown in FIG. 2, antenna 30 includes a photodiode (PD) 42 coupled between radiating element arms 36. Electronic devices that include antennas 30 with photodiodes 42 such as device 10 may sometimes also be referred to as electro-optical devices (e.g., electro-optical device 10). Photodiode 42 may be a programmable photodiode. An example in which photodiode 42 is a programmable uni-travelling-carrier photodiode (UTC PD) is described herein as an example. Photodiode 42 may therefore sometimes be referred to herein as UTC PD 42 or programmable UTC PD 42. This is illustrative and non-limiting. In general, photodiode 42 may include any desired type of adjustable/programmable photodiode or component that converts electromagnetic energy (e.g., light or light energy) at optical frequencies (e.g., infrared, visible, and/or ultraviolet frequencies) to current at THF frequencies on radiating element arms 36 and/or vice versa. Each radiating element arm 36 may, for example, have a first edge at UTC PD 42 and a second edge opposite the first edge that is wider than the first edge (e.g., in implementations where antenna 30 is a bowtie antenna). Other radiating elements may be used if desired.

UTC PD 42 may have a bias terminal 38 that receives one or more control signals $V_{BIAS}$. Control signals $V_{BIAS}$ may include bias voltages provided at one or more voltage levels and/or other control signals for controlling the operation of UTC PD 42 such as impedance adjustment control signals for adjusting the output impedance of UTC PD 42. Control circuitry 14 (FIG. 1) may provide (e.g., apply, supply, assert, etc.) control signals $V_{BIAS}$ at different settings (e.g., values, magnitudes, etc.) to dynamically control (e.g., program or adjust) the operation of UTC PD 42 over time. For example, control signals $V_{BIAS}$ may be used to control whether antenna 30 transmits THF signals 32 or receives THF signals 34. When control signals $V_{BIAS}$ include a bias voltage asserted at a first level or magnitude, antenna 30 may be configured to transmit THF signals 32. When control signals $V_{BIAS}$ include a bias voltage asserted at a second level or magnitude, antenna 30 may be configured to receive THF signals 34. In the example of FIG. 2, control signals $V_{BIAS}$ include the bias voltage asserted at the first level to configure antenna 30 to transmit THF signals 32. If desired, control signals $V_{BIAS}$ may also be adjusted to control the waveform of the THF signals (e.g., as a squaring function that preserves the modulation of incident optical signals, a linear function, etc.), to perform gain control on the signals conveyed by antenna 30, and/or to adjust the output impedance of UTC PD 42.

As shown in FIG. 2, UTC PD 42 may be optically coupled to optical path 40. Optical path 40 may include one or more optical fibers or waveguides. UTC PD 42 may receive optical signals from transceiver circuitry 26 (FIG. 1) over optical path 40. The optical signals may include a first optical local oscillator (LO) signal LO1 and a second optical local oscillator signal LO2. Optical local oscillator signals LO1 and LO2 may be generated by light sources in transceiver circuitry 26 (FIG. 1). Optical local oscillator signals LO1 and LO2 may be at optical wavelengths (e.g., between 400 nm and 700 nm), ultra-violet wavelengths (e.g., near-ultra-violet or extreme ultraviolet wavelengths), and/or infrared wavelengths (e.g., near-infrared wavelengths, mid-infrared wavelengths, or far-infrared wavelengths). Optical local oscillator signal LO2 may be offset in wavelength from optical local oscillator signal LO1 by a wavelength offset X. Wavelength offset X may be equal to the wavelength of the THF signals conveyed by antenna 30 (e.g., between 100 GHz and 1 THz (1000 GHz), between 100 GHz and 2 THz, between 300 GHz and 800 GHz, between 300 GHz and 1 THz, between 300 and 400 GHz, etc.).

During signal transmission, wireless data (e.g., wireless data packets, symbols, frames, etc.) may be modulated onto optical local oscillator signal LO2 to produce modulated optical local oscillator signal LO2'. If desired, optical local oscillator signal LO1 may be provided with an optical phase shift S. Optical path 40 may illuminate UTC PD 42 with optical local oscillator signal LO1 (plus the optical phase shift S when applied) and modulated optical local oscillator signal LO2'. If desired, lenses or other optical components may be interposed between optical path 40 and UTC PD 42 to help focus the optical local oscillator signals onto UTC PD 42.

UTC PD 42 may convert optical local oscillator signal LO1 and modulated local oscillator signal LO2' (e.g., beats between the two optical local oscillator signals) into antenna currents that run along the perimeter of radiating element arms 36. The frequency of the antenna currents is equal to the frequency difference between local oscillator signal LO1 and modulated local oscillator signal LO2'. The antenna currents may radiate (transmit) THF signals 32 into free space. Control signal $V_{BIAS}$ may control UTC PD 42 to convert the optical local oscillator signals into antenna currents on radiating element arms 36 while preserving the modulation and thus the wireless data on modulated local oscillator signal LO2' (e.g., by applying a squaring function to the signals). THF signals 32 will thereby carry the modulated wireless data for reception and demodulation by external wireless communications equipment.

Figure 3:
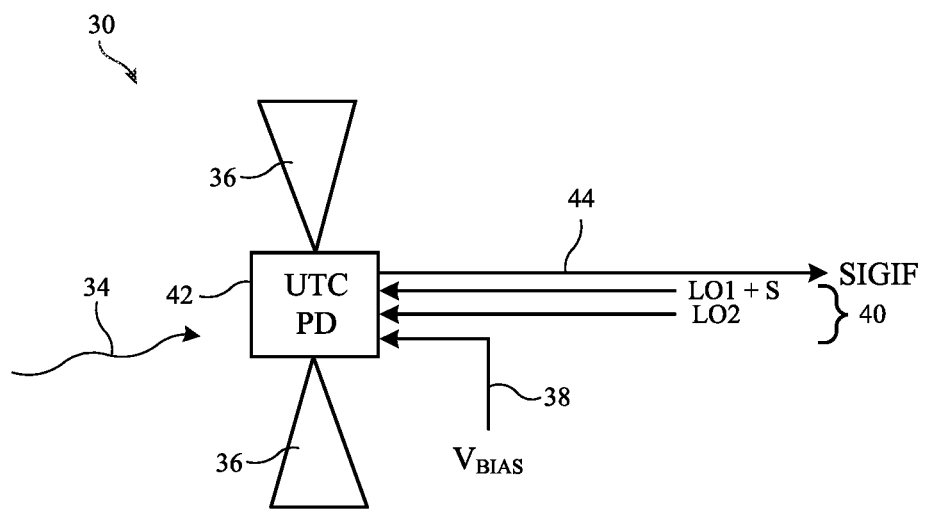
FIG. 3 is a top view showing how an illustrative antenna of the type shown in FIG. 2 may convert received wireless signals at frequencies greater than about 100 GHz into intermediate frequency signals based on optical LO signals in accordance with some embodiments.

FIG. 3 is a diagram showing how antenna 30 may receive THF signals 34 (e.g., after changing the setting of control signals $V_{BIAS}$ into a reception state from the transmission state of FIG. 2). As shown in FIG. 3, THF signals 34 may be incident upon antenna radiating element arms 36. The incident THF signals 34 may produce antenna currents that flow around the perimeter of radiating element arms 36. UTC PD 42 may use optical local oscillator signal LO1 (plus the optical phase shift S when applied), optical local oscillator signal LO2 (e.g., without modulation), and control signals $V_{BIAS}$ (e.g., a bias voltage asserted at the second level) to convert the received THF signals 34 into intermediate frequency signals SIGIF that are output onto intermediate frequency signal path 44.

The frequency of intermediate frequency signals SIGIF may be equal to the frequency of THF signals 34 minus the difference between the frequency of optical local oscillator signal LO1 and the frequency of optical local oscillator signal LO2. As an example, intermediate frequency signals SIGIF may be at lower frequencies than THF signals 32 and 34 such as centimeter or millimeter wave frequencies between 10 GHz and 100 GHz, between 30 GHz and 80 GHz, around 60 GHz, etc. If desired, transceiver circuitry 26 (FIG. 1) may change the frequency of optical local oscillator signal LO1 and/or optical local oscillator signal LO2 when switching from transmission to reception or vice versa. UTC PD 42 may preserve the data modulation of THF signals 34 in intermediate signals SIGIF. A receiver in transceiver circuitry 26 (FIG. 1) may demodulate intermediate frequency signals SIGIF (e.g., after further downconversion) to recover the wireless data from THF signals 34. In another example, wireless circuitry 24 may convert intermediate frequency signals SIGIF to the optical domain before recovering the wireless data. In yet another example, intermediate frequency signal path 44 may be omitted and UTC PD 42 may convert THF signals 34 into the optical domain for subsequent demodulation and data recovery (e.g., in a sideband of the optical signal).

Figure 4:
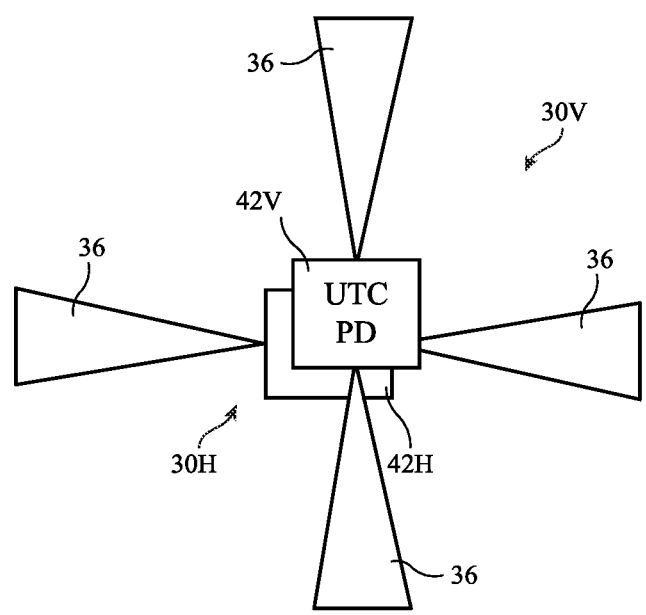
FIG. 4 is a top view showing how multiple antennas of the type shown in FIGS. 2 and 3 may be stacked to cover multiple polarizations in accordance with some embodiments.

The antenna 30 of FIGS. 2 and 3 may support transmission of THF signals 32 and reception of THF signals 34 with a given polarization (e.g., a linear polarization such as a vertical polarization). If desired, wireless circuitry 24 (FIG. 1) may include multiple antennas 30 for covering different polarizations. FIG. 4 is a diagram showing one example of how wireless circuitry 24 may include multiple antennas 30 for covering different polarizations.

As shown in FIG. 4, the wireless circuitry may include a first antenna 30 such as antenna 30V for covering a first polarization (e.g., a first linear polarization such as a vertical polarization) and may include a second antenna 30 such as antenna 30H for covering a second polarization different from or orthogonal to the first polarization (e.g., a second linear polarization such as a horizontal polarization). Antenna 30V may have a UTC PD 42 such as UTC PD 42V coupled between a corresponding pair of radiating element arms 36. Antenna 30H may have a UTC PD 42 such as UTC PD 42H coupled between a corresponding pair of radiating element arms 36 oriented non-parallel (e.g., orthogonal) to the radiating element arms 36 in antenna 30V. This may allow antennas 30V and 30H to transmit THF signals 32 with respective (orthogonal) polarizations and may allow antennas 30V and 30H to receive THF signals 32 with respective (orthogonal) polarizations.

To minimize space within device 10, antenna 30V may be vertically stacked over or under antenna 30H (e.g., where UTC PD 42V partially or completely overlaps UTC PD 42H). In this example, antennas 30V and 30H may both be formed on the same substrate such as a rigid or flexible printed circuit board. The substrate may include multiple stacked dielectric layers (e.g., layers of ceramic, epoxy, flexible printed circuit board material, rigid printed circuit board material, etc.). The radiating element arms 36 in antenna 30V may be formed on a separate layer of the substrate than the radiating element arms 36 in antenna 30H or the radiating element arms 36 in antenna 30V may be formed on the same layer of the substrate as the radiating element arms 36 in antenna 30H. UTC PD 42V may be formed on the same layer of the substrate as UTC PD 42H or UTC PD 42V may be formed on a separate layer of the substrate than UTC PD 42H. UTC PD 42V may be formed on the same layer of the substrate as the radiating element arms 36 in antenna 30V or may be formed on a separate layer of the substrate as the radiating element arms 36 in antenna 30V. UTC PD 42H may be formed on the same layer of the substrate as the radiating element arms 36 in antenna 30H or may be formed on a separate layer of the substrate as the radiating element arms 36 in antenna 30H.

Figure 5:
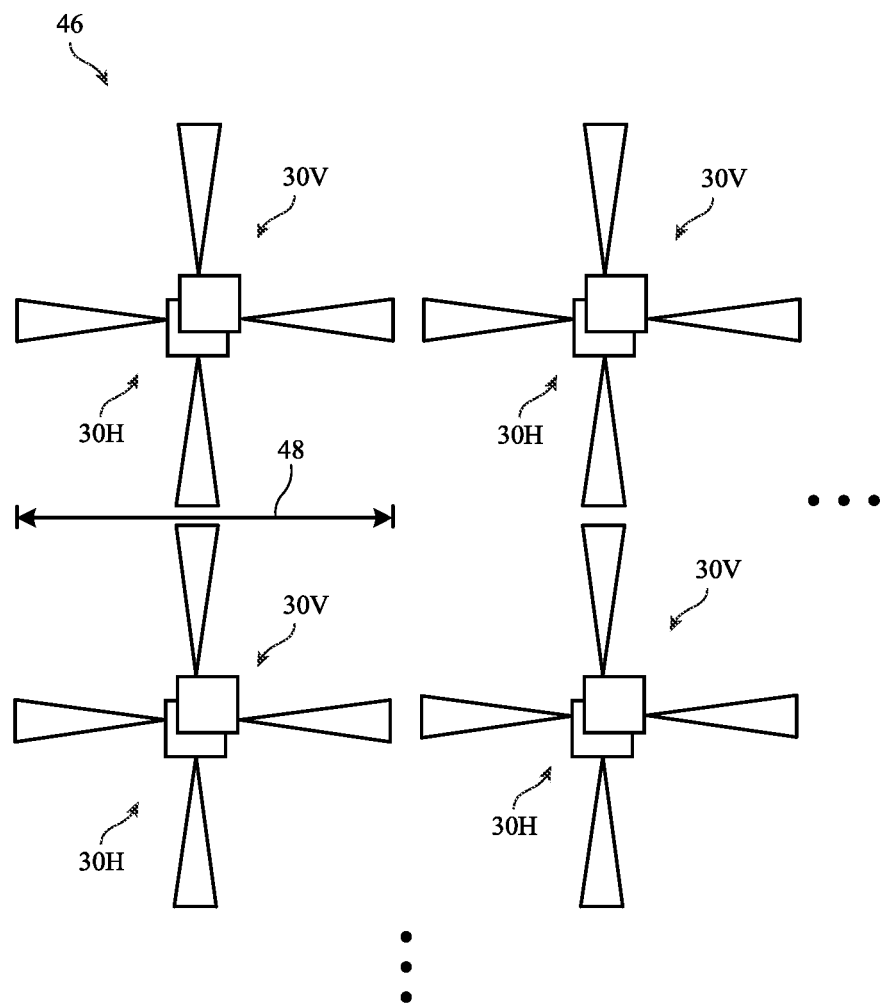
FIG. 5 is a top view showing how stacked antennas of the type shown in FIG. 4 may be integrated into a phased antenna array for conveying wireless signals at frequencies greater than about 100 GHz within a corresponding signal beam.

If desired, antennas 30 or antennas 30H and 30V of FIG. 4 may be integrated within a phased antenna array. FIG. 5 is a diagram showing one example of how antennas 30H and 30V may be integrated within a phased antenna array. As shown in FIG. 5, device 10 may include a phased antenna array 46 of stacked antennas 30H and 30V arranged in a rectangular grid of rows and columns. Each of the antennas in phased antenna array 46 may be formed on the same substrate. This is illustrative and non-limiting. In general, phased antenna array 46 (sometimes referred to as a phased array antenna) may include any desired number of antennas 30V and 30H (or non-stacked antennas 30) arranged in any desired pattern. Each of the antennas in phased antenna array 46 may be provided with a respective optical phase shift S (FIGS. 2 and 3) that configures the antennas to collectively transmit THF signals 32 and/or receive THF signals 34 that sum to form a signal beam of THF signals in a desired beam pointing direction. The beam pointing direction may be selected to point the signal beam towards external communications equipment, towards a desired external object, away from an external object, etc.

Phased antenna array 46 may occupy relatively little space within device 10. For example, each antenna 30V/30H may have a length 48 (e.g., as measured from the end of one radiating element arm to the opposing end of the opposite radiating element arm). Length 48 may be approximately equal to one-half the wavelength of THF signals 32 and 34. For example, length 48 may be as small as 0.5 mm or less. Each UTC-PD 42 in phased antenna array 46 may occupy a lateral area of 100 square microns or less. This may allow phased antenna array 46 to occupy very little area within device 10, thereby allowing the phased antenna array to be integrated within different portions of device 10 while still allowing other space for device components. The examples of FIGS. 2-5 are illustrative and non-limiting. In general, each antenna may have any desired antenna radiating element architecture.

Figure 6:
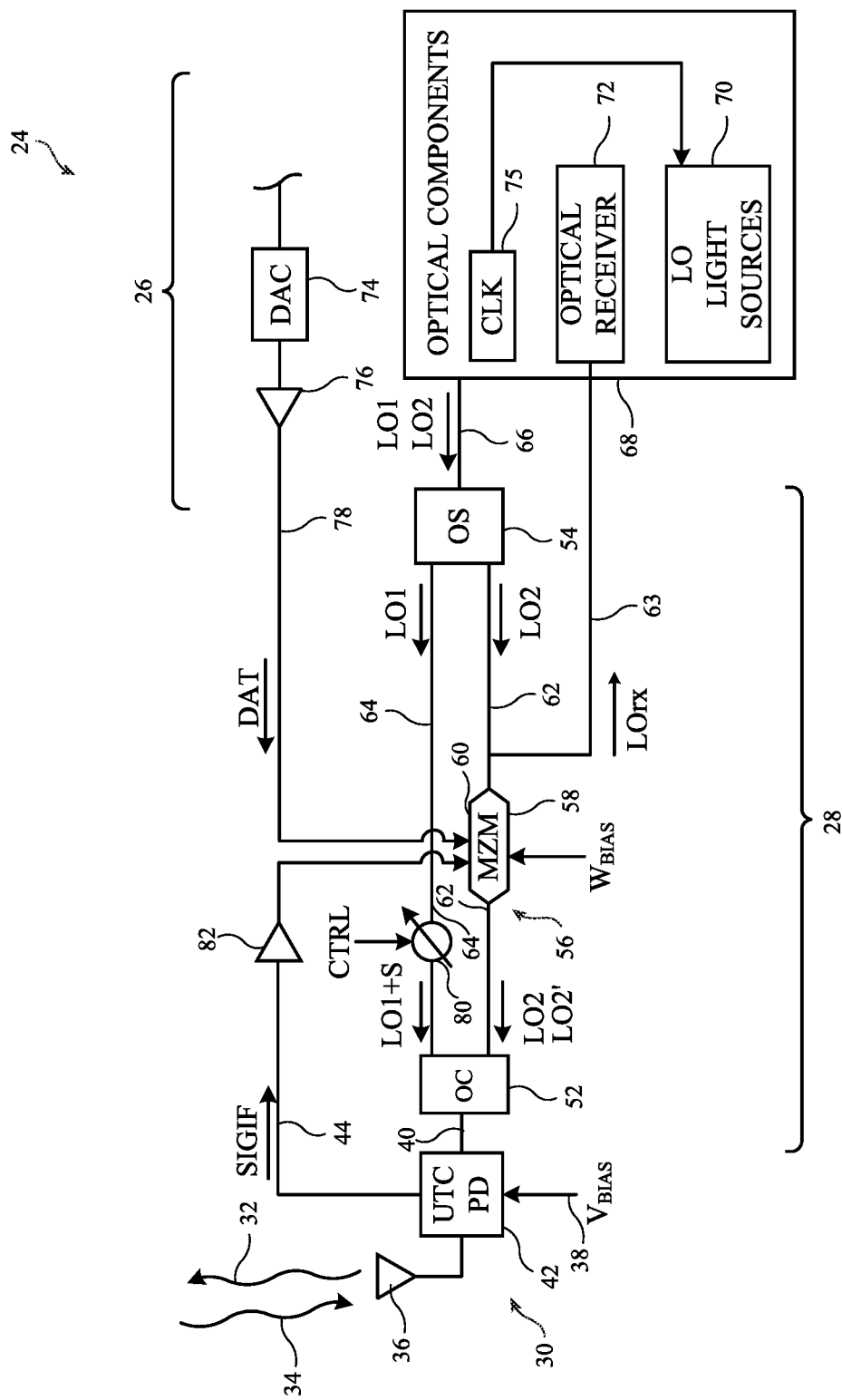
FIG. 6 is a circuit diagram of illustrative wireless circuitry having an antenna that transmits wireless signals at frequencies greater than about 100 GHz and that receives wireless signals at frequencies greater than about 100 GHz for conversion to intermediate frequencies and then to the optical domain in accordance with some embodiments.

FIG. 6 is a circuit diagram showing how a given antenna 30 and signal path 28 (FIG. 1) may be used to both transmit THF signals 32 and receive THF signals 34 based on optical local oscillator signals. In the example of FIG. 6, UTC PD 42 converts received THF signals 34 into intermediate frequency signals SIGIF that are then converted to the optical domain for recovering the wireless data from the received THF signals.

As shown in FIG. 6, wireless circuitry 24 may include transceiver circuitry 26 coupled to antenna 30 over signal path 28 (e.g., an optical signal path sometimes referred to herein as optical signal path 28). UTC PD 42 may be coupled between the radiating element arm(s) 36 of antenna 30 and signal path 28. Transceiver circuitry 26 may include optical components 68, amplifier circuitry such as power amplifier 76, and digital-to-analog converter (DAC) 74. Optical components 68 may include an optical receiver such as optical receiver 72 and optical local oscillator (LO) light sources (emitters) 70. LO light sources 70 may include two or more light sources (e.g., sources of electromagnetic energy, light, or light energy) such as laser light sources, laser diodes, optical phase locked loops, or other optical emitters that emit light (e.g., electromagnetic energy, light, or light energy that includes optical local oscillator signals LO1 and LO2) at respective wavelengths (e.g., visible, infrared, and/or ultraviolet wavelengths). If desired, LO light sources 70 may include a single light source and may include optical components for splitting the light emitted by the light source into different wavelengths. Signal path 28 may be coupled to optical components 68 over optical path 66. Optical path 66 may include one or more optical fibers and/or waveguides.

Signal path 28 may include an optical splitter such as optical splitter (OS) 54, optical paths such as optical path 64 and optical path 62, an optical combiner such as optical combiner (OC) 52, and optical path 40. Optical path 62 may be an optical fiber or waveguide. Optical path 64 may be an optical fiber or waveguide. Optical splitter 54 may have a first (e.g., input) port coupled to optical path 66, a second (e.g., output) port coupled to optical path 62, and a third (e.g., output) port coupled to optical path 64. Optical path 64 may couple optical splitter 54 to a first (e.g., input) port of optical combiner 52. Optical path 62 may couple optical splitter 54 to a second (e.g., input) port of optical combiner 52. Optical combiner 52 may have a third (e.g., output) port coupled to optical path 40.

An optical phase shifter such as optical phase shifter 80 may be (optically) interposed on or along optical path 64. An optical modulator such as optical modulator 56 may be (optically) interposed on or along optical path 62. Optical modulator 56 may be, for example, a Mach-Zehnder modulator (MZM) and may therefore sometimes be referred to herein as MZM 56. MZM 56 includes a first optical arm (branch) 60 and a second optical arm (branch) 58 interposed in parallel along optical path 62. Propagating optical local oscillator signal LO2 along arms 60 and 58 of MZM 56 may, in the presence of a voltage signal applied to one or both arms, allow different optical phase shifts to be imparted on each arm before recombining the signal at the output of the MZM (e.g., where optical phase modulations produced on the arms are converted to intensity modulations at the output of MZM 56). When the voltage applied to MZM 56 includes wireless data, MZM 56 may modulate the wireless data onto optical local oscillator signal LO2. If desired, the phase shifting performed at MZM 56 may be used to perform beam forming/steering in addition to or instead of optical phase shifter 80. MZM 56 may receive one or more bias voltages $W_{BIAS}$ (sometimes referred to herein as bias signals $W_{BIAS}$) applied to one or both of arms 58 and 60. Control circuitry 14 (FIG. 1) may provide bias voltage $W_{BIAS}$ with different magnitudes to place MZM 56 into different operating modes (e.g., operating modes that suppress optical carrier signals, operating modes that do not suppress optical carrier signals, etc.).

Intermediate frequency signal path 44 may couple UTC PD 42 to MZM 56 (e.g., arm 60). An amplifier such as low noise amplifier 82 may be interposed on intermediate frequency signal path 44. Intermediate frequency signal path 44 may be used to pass intermediate frequency signals SIGIF from UTC PD 42 to MZM 56. DAC 74 may have an input coupled to up-conversion circuitry, modulator circuitry, and/or baseband circuitry in a transmitter of transceiver circuitry 26. DAC 74 may receive digital data to transmit over antenna 30 and may convert the digital data to the analog domain (e.g., as data DAT). DAC 74 may have an output coupled to transmit data path 78. Transmit data path 78 may couple DAC 74 to MZM 56 (e.g., arm 60). Each of the components along signal path 28 may allow the same antenna 30 to both transmit THF signals 32 and receive THF signals 34 (e.g., using the same components along signal path 28), thereby minimizing space and resource consumption within device 10.

LO light sources 70 may produce (emit) optical local oscillator signals LO1 and LO2 (e.g., at different wavelengths that are separated by the wavelength of THF signals 32/34). Optical components 68 may include lenses, waveguides, optical couplers, optical fibers, and/or other optical components that direct the emitted optical local oscillator signals LO1 and LO2 towards optical splitter 54 via optical path 66. Optical splitter 54 may split the optical signals on optical path 66 (e.g., by wavelength) to output optical local oscillator signal LO1 onto optical path 64 while outputting optical local oscillator signal LO2 onto optical path 62.

Control circuitry 14 (FIG. 1) may provide phase control signals CTRL to optical phase shifter 80. Phase control signals CTRL may control optical phase shifter 80 to apply optical phase shift S to the optical local oscillator signal LO1 on optical path 64. Phase shift S may be selected to steer a signal beam of THF signals 32/34 in a desired pointing direction. Optical phase shifter 80 may pass the phase-shifted optical local oscillator signal LO1 (denoted as LO1+S) to optical combiner 52. Signal beam steering is performed in the optical domain (e.g., using optical phase shifter 80) rather than in the THF domain because there are no satisfactory phase shifting circuit components that operate at frequencies as high as the frequencies of THF signals 32 and 34. Optical combiner 52 may receive optical local oscillator signal LO2 over optical path 62. Optical combiner 52 may combine optical local oscillator signals LO1 and LO2 onto optical path 40, which directs the optical local oscillator signals onto UTC PD 42 for use during signal transmission or reception.

During transmission of THF signals 32, DAC 74 may receive digital wireless data (e.g., data packets, frames, symbols, etc.) for transmission over THF signals 32. DAC 74 may convert the digital wireless data to the analog domain and may output (transmit) the data onto transmit data path 78 as data DAT (e.g., for transmission via antenna 30). Power amplifier 76 may amplify data DAT. Transmit data path 78 may pass data DAT to MZM 56 (e.g., arm 60). MZM 56 may modulate data DAT onto optical local oscillator signal LO2 to produce modulated optical local oscillator signal LO2' (e.g., an optical local oscillator signal at the frequency/wavelength of optical local oscillator signal LO2 but that is modulated to include the data identified by data DAT). Optical combiner 52 may combine optical local oscillator signal LO1 with modulated optical local oscillator signal LO2' at optical path 40.

Optical path 40 may illuminate UTC PD 42 with (using) optical local oscillator signal LO1 (e.g., with the phase shift S applied by optical phase shifter 80) and modulated optical local oscillator signal LO2'. Control circuitry 14 (FIG. 1) may apply a control signal $V_{BIAS}$ to UTC PD 42 that configures antenna 30 for the transmission of THF signals 32. UTC PD 42 may convert optical local oscillator signal LO1 and modulated optical local oscillator signal LO2' into antenna currents on radiating element arm(s) 36 at the frequency of THF signals 32 (e.g., while programmed for transmission using control signal $V_{BIAS}$). The antenna currents on radiating element arm(s) 36 may radiate THF signals 32. The frequency of THF signals 32 is given by the difference in frequency between optical local oscillator signal LO1 and modulated optical local oscillator signal LO2'. Control signals $V_{BIAS}$ may control UTC PD 42 to preserve the modulation from modulated optical local oscillator signal LO2' in the radiated THF signals 32. External equipment that receives THF signals 32 will thereby be able to extract data DAT from the THF signals 32 transmitted by antenna 30.

During reception of THF signals 34, MZM 56 does not modulate any data onto optical local oscillator signal LO2. Optical path 40 therefore illuminates UTC PD 42 with optical local oscillator signal LO1 (e.g., with phase shift S) and optical local oscillator signal LO2. Control circuitry 14 (FIG. 1) may apply a control signal $V_{BIAS}$ (e.g., a bias voltage) to UTC PD 42 that configures antenna 30 for the receipt of THF signals 32. UTC PD 42 may use optical local oscillator signals LO1 and LO2 to convert the received THF signals 34 into intermediate frequency signals SIGIF output onto intermediate frequency signal path 44 (e.g., while programmed for reception using bias voltage $V_{BIAS}$). Intermediate frequency signals SIGIF may include the modulated data from the received THF signals 34. Low noise amplifier 82 may amplify intermediate frequency signals SIGIF, which are then provided to MZM 56 (e.g., arm 60). MZM 56 may convert intermediate frequency signals SIGIF to the optical domain as optical signals LOrx (e.g., by modulating the data in intermediate frequency signals SIGIF onto one of the optical local oscillator signals) and may pass the optical signals to optical receiver 72 in optical components 68, as shown by arrow 63 (e.g., via optical paths 62 and 66 or other optical paths). Control circuitry 14 (FIG. 1) may use optical receiver 72 to convert optical signals LOrx to other formats and to recover (demodulate) the data carried by THF signals 34 from the optical signals. In this way, the same antenna 30 and signal path 28 may be used for both the transmission and reception of THF signals while also performing beam steering operations.

The example of FIG. 6 in which intermediate frequency signals SIGIF are converted to the optical domain is illustrative and non-limiting. If desired, transceiver circuitry 26 may receive and demodulate intermediate frequency signals SIGIF without first passing the signals to the optical domain. For example, transceiver circuitry 26 may include an analog-to-digital converter (ADC), intermediate frequency signal path 44 may be coupled to an input of the ADC rather than to MZM 56, and the ADC may convert intermediate frequency signals SIGIF to the digital domain. As another example, intermediate frequency signal path 44 may be omitted and control signals $V_{BIAS}$ may control UTC PD 42 to directly sample THF signals 34 with optical local oscillator signals LO1 and LO2 to the optical domain. As an example, UTC PD 42 may use the received THF signals 34 and control signals $V_{BIAS}$ to produce an optical signal on optical path 40. The optical signal may have an optical carrier with sidebands that are separated from the optical carrier by a fixed frequency offset (e.g., 30-100 GHz, 60 GHz, 50-70 GHz, 10-100 GHz, etc.). The sidebands may be used to carry the modulated data from the received THF signals 34. Signal path 28 may direct (propagate) the optical signal produced by UTC PD 42 to optical receiver 72 in optical components 68 (e.g., via optical paths 40, 64, 62, 66, 63, and/or other optical paths). Control circuitry 14 (FIG. 1) may use optical receiver 72 to convert the optical signal to other formats and to recover (demodulate) the data carried by THF signals 34 from the optical signal (e.g., from the sidebands of the optical signal).

If desired, optical components 68 may include clocking circuitry such as clocking (CLK) circuitry 75 (sometimes referred to herein as clock circuitry 75 or clock generation circuitry 75). Clocking circuitry 75 may include one or more electro-optical phase-locked loops (OPLLs), frequency locked loops (FLLs), and self-injection locked (locking) loops. As shown in FIG. 6, clocking circuitry 75 may be used to control and clock LO light sources 70 and/or to clock any other desired hardware in device 10 (e.g., clocking circuitry 75 need not be located in transceiver 26 and may, in general, be located elsewhere in device 10). LO light sources 70 may, for example, generate optical LO signals (e.g., optical local oscillator signals LO1 and LO2) that are phase-locked, self-injection locked, and/or frequency-locked with respect to each other using clocking circuitry 75.

Figure 7:
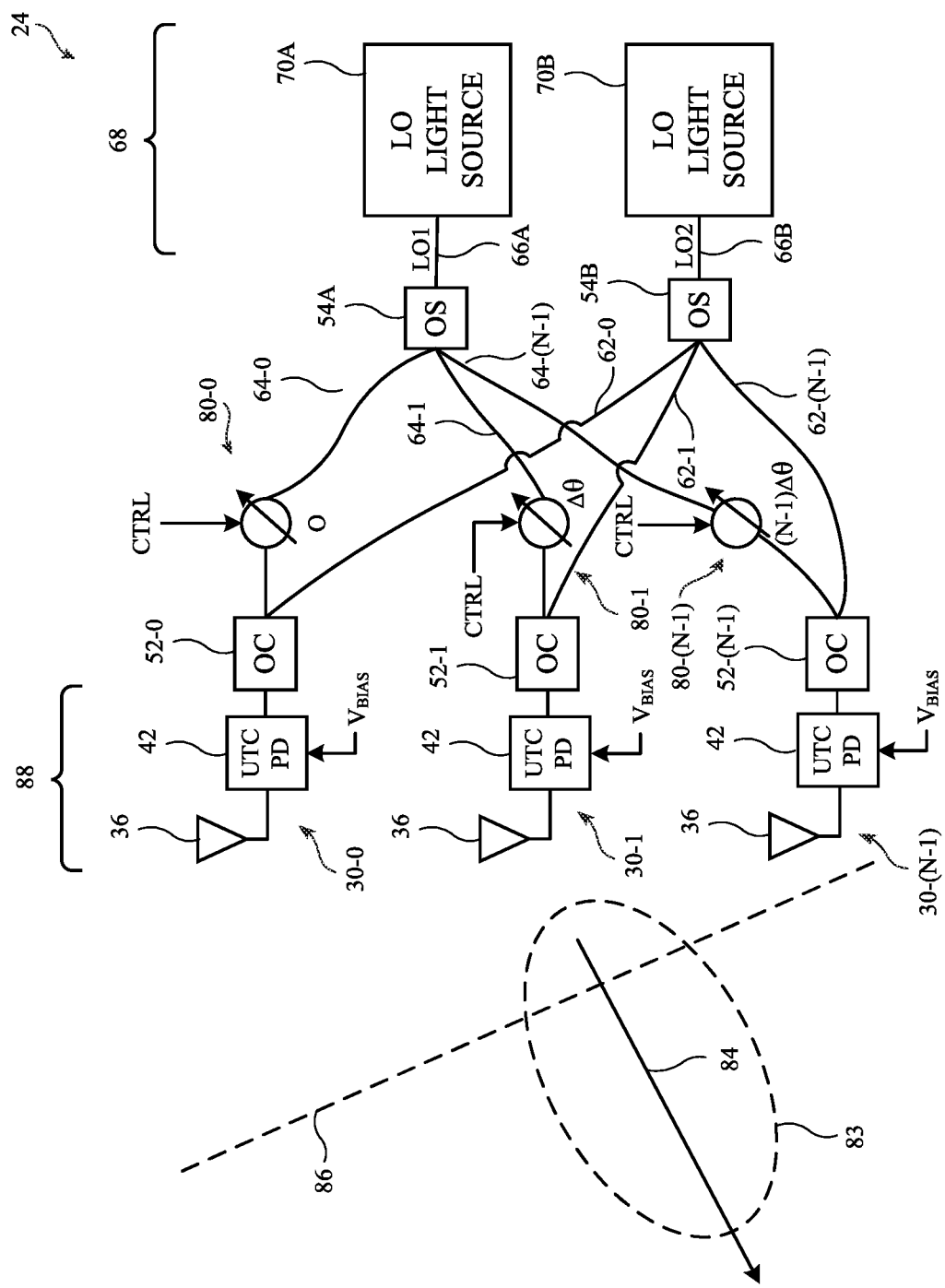
FIG. 7 is a circuit diagram of an illustrative phased antenna array that conveys wireless signals at frequencies greater than about 100 GHz within a corresponding signal beam in accordance with some embodiments.

FIG. 7 is a circuit diagram showing one example of how multiple antennas 30 may be integrated into a phased antenna array 88 that conveys THF signals over a corresponding signal beam. In the example of FIG. 7, MZMs 56, intermediate frequency signal paths 44, data paths 78, and optical receiver 72 of FIG. 6 have been omitted for the sake of clarity. Each of the antennas in phased antenna array 88 may alternatively sample received THF signals directly into the optical domain or may pass intermediate frequency signals SIGIF to ADCs in transceiver circuitry 26.

As shown in FIG. 7, phased antenna array 88 includes N antennas 30 such as a first antenna 30-0, a second antenna 30-1, and an Nth antenna 30-(N−1). Each of the antennas 30 in phased antenna array 88 may be coupled to optical components 68 via a respective optical signal path (e.g., optical signal path 28 of FIG. 6). Each of the N signal paths may include a respective optical combiner 52 coupled to the UTC PD 42 of the corresponding antenna 30 (e.g., the UTC PD 42 in antenna 30-0 may be coupled to optical combiner 52-0, the UTC PD 42 in antenna 30-1 may be coupled to optical combiner 52-1, the UTC PD 42 in antenna 30-(N−1) may be coupled to optical combiner 52-(N−1), etc.). Each of the N signal paths may also include a respective optical path 62 and a respective optical path 64 coupled to the corresponding optical combiner 52 (e.g., optical paths 64-0 and 62-0 may be coupled to optical combiner 52-0, optical paths 64-1 and 62-1 may be coupled to optical combiner 52-1, optical paths 64-(N−1) and 62-(N−1) may be coupled to optical combiner 52-(N−1), etc.).

Optical components 68 may include LO light sources 70 such as a first LO light source 70A and a second LO light source 70B. The optical signal paths for each of the antennas 30 in phased antenna array 88 may share one or more optical splitters 54 such as a first optical splitter 54A and a second optical splitter 54B. LO light source 70A may generate (e.g., produce, emit, transmit, etc.) first optical local oscillator signal LO1 and may provide first optical local oscillator signal LO1 to optical splitter 54A via optical path 66A. Optical splitter 54A may distribute first optical local oscillator signal LO1 to each of the UTC PDs 42 in phased antenna array 88 over optical paths 64 (e.g., optical paths 64-0, 64-1, 64-(N−1), etc.). Similarly, LO light source 70B may generate (e.g., produce, emit, transmit, etc.) second optical local oscillator signal LO2 and may provide second optical local oscillator signal LO2 to optical splitter 54B via optical path 66B. Optical splitter 54B may distribute second optical local oscillator signal LO2 to each of the UTC PDs 42 in phased antenna array 88 over optical paths 62 (e.g., optical paths 62-0, 62-1, 62-(N−1), etc.).

A respective optical phase shifter 80 may be interposed along (on) each optical path 64 (e.g., a first optical phase shifter 80-0 may be interposed along optical path 64-0, a second optical phase shifter may be interposed along optical path 64-1, an Nth optical phase shifter 80-(N−1) may be interposed along optical path 64-(N−1), etc.). Each optical phase shifter 80 may receive a control signal CTRL that controls the phase S provided to optical local oscillator signal LO1 by that optical phase shifter (e.g., first optical phase shifter 80-0 may impart an optical phase shift of zero degrees/radians to the optical local oscillator signal LO1 provided to antenna 30-0, second optical phase shifter 80-1 may impart an optical phase shift of $\Delta\phi$ to the optical local oscillator signal LO1 provided to antenna 30-1, Nth optical phase shifter 80-(N−1) may impart an optical phase shift of $(N-1)\Delta\phi$ to the optical local oscillator signal LO1 provided to antenna 30-(N−1), etc.). By adjusting the phase S imparted by each of the N optical phase shifters 80, control circuitry 14 (FIG. 1) may control each of the antennas 30 in phased antenna array 88 to transmit THF signals 32 and/or to receive THF signals 34 within a formed signal beam 83. Signal beam 83 may be oriented in a particular beam pointing direction (angle) 84 (e.g., the direction of peak gain of signal beam 83). The THF signals conveyed by phased antenna array 88 may have wavefronts 86 that are orthogonal to beam pointing direction 84. Control circuitry 14 may adjust beam pointing direction 84 over time to point towards external communications equipment or an external object or to point away from external objects, as examples.

Phased antenna array 88 may be operable in an active mode in which the array transmits and/or receives THF signals using optical local oscillator signals LO1 and LO2 (e.g., using phase shifts provided to each antenna element to steer signal beam 83). If desired, phased antenna array 88 may also be operable in a passive mode in which the array does not transmit or receive THF signals. Instead, in the passive mode, phased antenna array 88 may be configured to form a passive reflector that reflects THF signals or other electromagnetic waves incident upon device 10. In the passive mode, the UTC PDs 42 in phased antenna array 88 are not illuminated by optical local oscillator signals LO1 and LO2 and transceiver circuitry 26 performs no modulation/demodulation, mixing, filtering, detection, modulation, and/or amplifying of the incident THF signals.

Devices with processing capabilities include clocking circuitry that generate clock signals. Devices with THF signaling capabilities such as device 10 are particularly sensitive to jitter (deviations from perfect periodicity) and phase noise frequency generation in clock signals (e.g., because the clocking circuitry consumes a relatively high amount of power and chip area for THF frequencies). To minimize clock jitter and phase noise, processing operations in device 10 may be clocked using clocking circuitry Examples in which THF communications using transceiver 26 (FIG. 1) are clocked using clocking circuitry 75 are described herein as an example. This is illustrative and non-limiting. In general, clocking circuitry 75 may be used to clock any desired processing operations in device 10 (e.g., high speed digital interface operations, processor computations, sensing, automotive, input/output operations, communications at frequencies lower than 100 GHz such as millimeter/centimeter wave frequencies or frequencies less than 10 GHz, etc.).

Figure 8:
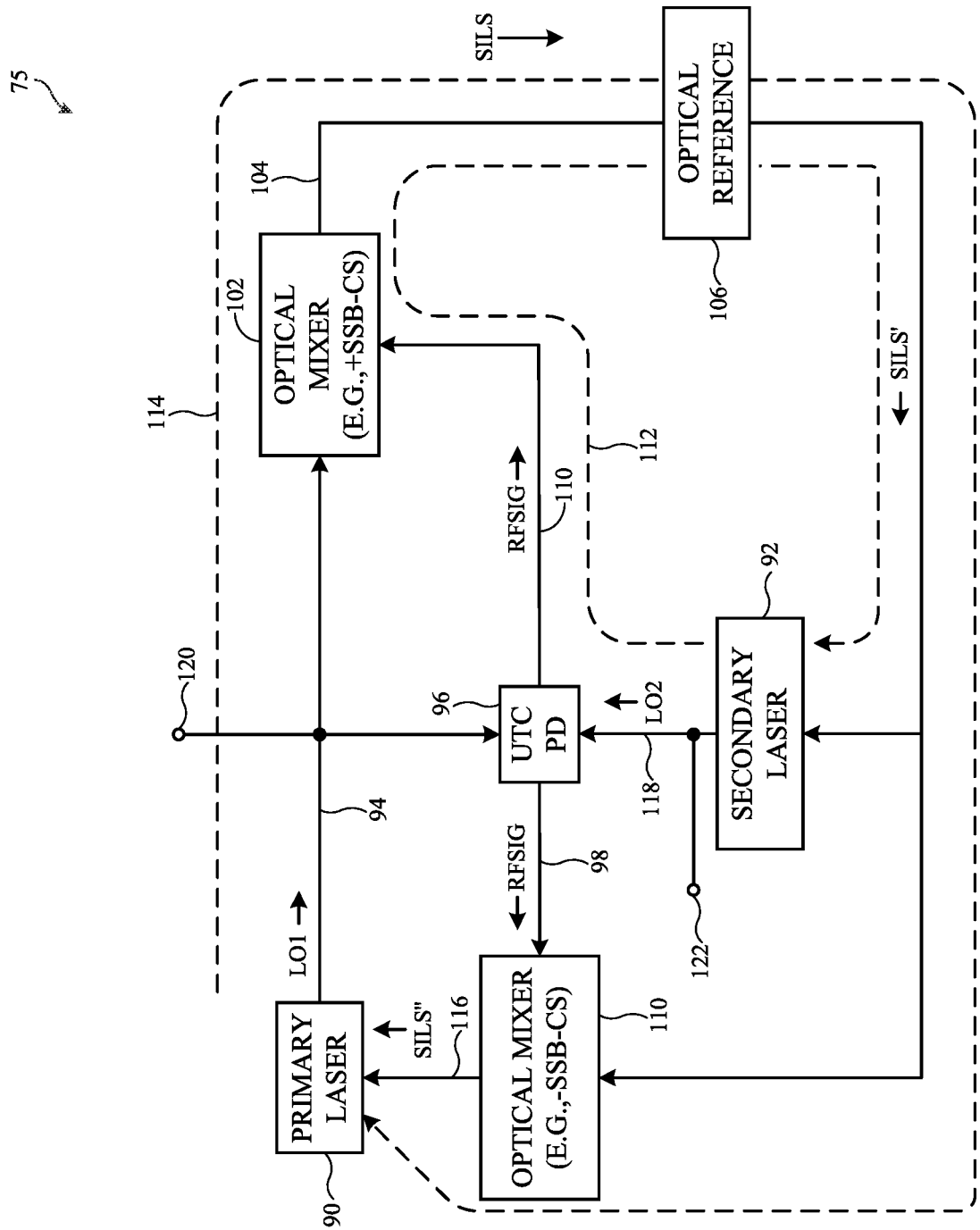
FIG. 8 is a circuit diagram of illustrative clocking circuitry having first and second light sources that perform self-injection locking using an optical reference to minimize phase noise in accordance with some embodiments.

FIG. 8 is a circuit diagram of clocking circuitry 75. As shown in FIG. 8, clocking circuitry 75 may include a photodiode such UTC PD 96, a first light source such as primary laser 90 (e.g., from LO light sources 70 of FIG. 6), a second light source such as secondary laser 92 (e.g., from LO light sources of FIG. 6), a first mixer such as optical mixer 102, a second mixer such as optical mixer 110, and an optical reference such as optical reference 106. UTC PD 96 need not be a UTC PD and may, in general, include other types of photodiode.

First optical mixer 102 may be an electro-optical mixer such as an MZM, for example. First optical mixer 102 may modulate (mix) a received optical signal with a received electrical signal. Second optical mixer 110 may also be an electro-optical mixer such as an MZM, for example. Second optical mixer 110 may modulate (mix) a received optical signal with a received electrical signal. These electro-optical modulations may produce output signals having a carrier at the frequency of the optical signal, a first (left) sideband at the frequency of the optical signal minus the frequency of the electrical signal, and a second (right) sideband at the frequency of the optical signal plus the frequency of the electrical signal. If desired, the optical mixers may filter or suppress the carrier and one of the sidebands in generating its corresponding output signal in a process sometimes referred to as single sideband modulation carrier suppression (SSB-CS).

Secondary laser 92 may have an output coupled to optical path 118. An output terminal 122 of clocking circuitry 75 may be coupled to optical path 118. Primary laser 90 may have an output coupled to optical path 94. An output terminal 120 of clocking circuitry 75 may be coupled to optical path 94. Optical path 94 may be coupled to a first input of optical mixer 102. Optical paths 94 and 118 may be coupled to one or more inputs of UTC PD 96 (e.g., optical paths 94 and 118 separately illuminate UTC PD or may be coupled to an optical combiner that illuminates UTC PD 96 using both optical local oscillator signals). UTC PD 96 may have an output coupled to a second input of optical mixer 102 (e.g., an electrical input of optical mixer 102) over radio-frequency path 100 and coupled to a first input of optical mixer 110 (e.g., an electrical input of optical mixer 110) over radio-frequency path 98.

Optical mixer 102 may have an output coupled to optical path 104. Optical path 104 may be coupled to an input of secondary laser 92 (e.g., a control input of secondary laser 92) and to a second input of optical mixer 110. The output of optical mixer 110 may be coupled to the input of primary laser 90 (e.g., a control input of primary laser 90) over optical path 116. Optical paths 118, 94, 104, and 116 may each include one or more optical fibers, optical waveguides, optical splitters, optical combiners, optical switches, optical lenses, optical prisms, optical beam splitters, and/or optical couplers. Radio-frequency paths 100 and 98 may include radio-frequency transmission line structures, conductive traces, conductive wiring, radio-frequency waveguides, etc.

An optical reference such as optical reference 106 may be disposed (e.g., interposed) on optical path 104 between the output of optical mixer 102 and the inputs of secondary laser 92 and optical mixer 110. Put differently, the output of optical mixer 102 may be coupled to an input of optical reference 106 over a first portion of optical path 104 and the output of optical reference 106 may be coupled to secondary laser 92 and optical mixer 110 over a second portion of optical 104. Optical reference 106 may include optical components that remove, clean, and/or reduce phase noise of optical signals (photons) received at its input over optical path 104. Optical reference 106 may thereby output optical signals (photons) onto optical path 104 having reduced phase noise relative to the photons received by optical reference 106. The optical components in optical reference 106 may be configured to keep photons traveling along optical path 104 within optical reference 106 longer than the photons would otherwise be within optical path 104 in the absence of optical reference 106. This photon retention allows the photons to circulate within the optical reference, increasing photon lifetime and quality factor in a manner that reduces the phase noise of the photons. The optical components may be passive components to help prevent the introduction of additional noise to the optical signals along optical path 104. If desired, optical reference 106 may be controlled by a temperature controller to further stabilize the photons within optical reference 106.

Optical reference 106 may include, for example, an optical delay line. The optical delay line may include one or more long optical fibers (e.g., optical fibers that are several meters or km in length). Additionally or alternatively, optical reference 106 may include an optical resonator. Optical resonators circulate received photons in resonance within the optical resonator with a high Q-factor (e.g., where the Q-factor is a function of how long the photons remain inside the optical resonator). In general, optical delay lines are not frequency selective whereas optical resonators are frequency selective (e.g., functioning similar to an optical filter on the received photons). At the same time, optical resonators are significantly smaller than optical delay lines and may therefore be easier to integrate into compact devices such as device 10. Additionally or alternatively, optical reference 106 may include any other desired optical components that serve to reduce the phase noise of photons received from the output of optical mixer 102.

During operation, primary laser 90 may emit first optical local oscillator signal LO1 on optical path 94. Secondary laser 92 may emit second optical local oscillator signal LO2 on optical path 118. Output terminals 120 and 122 may transmit optical local oscillator signals LO1 and LO2, respectively, to clock other components in device 10. In implementations where clocking circuitry 75 is used to clock THF communications using transceiver 26 (FIG. 1), terminal 122 may be coupled to optical path 62 and terminal 120 may be coupled to optical path 64 of FIG. 6, for example.

Clocking circuitry 75 may include multiple control/feedback loops that are used to minimize phase noise and jitter in the optical LO signals provided to output terminals 120 and 122. As shown in FIG. 8, clocking circuitry 75 may include at least a first self-injection locking loop around primary laser 90 (e.g., an outer loop) and a second self-injection locking loop around secondary laser 92 (e.g., an inner loop). At least part of the second self-injection locking loop may form part of the first self-injection locking loop.

For example, the output of primary laser 90, optical path 94, optical mixer 102, optical path 104, optical mixer 110, and optical path 116 may form the first self-injection locking loop, as shown by path 114 (sometimes referred to herein as self-injection locking loop 114, self-injection locking loop path 114, or loop path 114). The output of secondary laser 92, optical path 118, UTC PD 96, radio-frequency path 100, optical mixer 102, and a portion of optical path 104 extending from optical mixer 102 to the input of secondary laser 92 may form the second self-injection locking loop, as shown by path 112 (sometimes referred to herein as self-injection locking loop 112, self-injection locking loop path 112, or loop path 112). Optical reference 106 may be disposed on (e.g., may form a part of) both self-injection locking loops 112 and 114.

Primary laser 90 may emit first optical local oscillator signal LO1 at a first optical frequency F1 (e.g., 200,000 GHz). Secondary laser 92 may emit second optical local oscillator signal LO2 at a second optical frequency F2 (e.g., 200,300 GHz). Second optical frequency F2 may be offset from first optical frequency F1 by a frequency offset Y (e.g., Y=200,300−200,000=300 GHz). Optical frequencies F1 and F2 and thus frequency offset Y may be selected so that frequency offset Y is a radio frequency such as the frequency of the THF signals 32 to be transmitted and/or the THF signals 34 to be received by the antenna 36 fed using optical local oscillator signals LO1 and LO2 (e.g., 300 GHz, 100-1000 GHz, etc.).

Optical path 94 may illuminate UTC PD 96 using optical local oscillator signal LO1. Optical path 118 may concurrently illuminate UTC PD 96 using optical local oscillator signal LO2. UTC PD 96 may generate a radio-frequency signal RFSIG in response to illumination by optical local oscillator signals LO1 and LO2 (e.g., by heterodyning optical local oscillator signals LO1 and LO2 on UTC PD 96). UTC PD 96 may transmit radio-frequency signal RFSIG to the first input of optical mixer 110 over radio-frequency path 98 and may transmit radio-frequency signal RFSIG to the second input of optical mixer 102 over radio-frequency path 100. Radio-frequency signal RFSIG may have a frequency equal to frequency offset Y (e.g., 300 GHz).

Optical mixer 102 may generate self-injection locking signal SILS based on first optical local oscillator signal LO1 and radio-frequency signal RFSIG (e.g., by mixing, multiplying, or modulating first optical local oscillator signal LO1 by radio-frequency signal RFSIG). Optical mixer 102 may output self-injection locking signal SILS on optical path 104. Self-injection locking signal SILS may be an optical signal having a frequency equal to the sum of first optical frequency F1 of first optical local oscillator signal LO1 and the frequency of radio-frequency signal RFSIG (e.g., self-injection locking signal SILS may have a frequency equal to F1+Y=200,000+300=200,300 GHz, which is the same as the second optical frequency F2 of secondary laser 92).

Optical reference 106 may receive self-injection locking signals SILS from optical mixer 102 over optical path 104. Optical reference 106 may clean, reduce, and/or remove phase noise from self-injection locking signals SILS to produce reduced phase noise self-injection locking signal SILS' (e.g., by circulating, resonating, or retaining the photons in self-injection locking signals SILS within optical reference 106 for an extended period). Optical reference 106 may output and transmit reduced phase noise self-injection locking signal SILS' to the input of secondary laser 92 and the second input of optical mixer 110 over optical path 104.

Optical mixer 110 may generate modified self-injection locking signal SILS" based on reduced phase noise self-injection locking signal SILS' and the radio-frequency signal RFSIG received over radio-frequency path 98 (e.g., by mixing, multiplying, or modulating first optical local oscillator signal LO1 by radio-frequency signal RFSIG) in a manner that outputs modified self-injection locking signal SILS" at the intended optical frequency of primary laser 90 (e.g., at the first optical frequency F1 of first optical local oscillator LO1 such as 200,000 GHz).

In some implementations that are described herein as an example, optical mixer 102 and optical mixer 110 may perform opposite single sideband modulation carrier suppression (SSB-CS) operations on their respective inputs to produce both modified self-injection locking signal SILS" and self-injection locking signal SILS at their respective frequencies based on the same radio-frequency signal RFSIG output by UTC PD 96. For example, the right sideband modulation carrier suppression (+SSB-CS) performed by optical mixer 102 may involve mixing first optical local oscillator LO1 with radio-frequency signal RFSIG while filtering out both the carrier (at first optical frequency F1 or 200,000 GHz) and the left sideband (at frequency F1−Y or 200,000−300 GHz), leaving the right sideband to form self-injection locking signal SILS at frequency F1+Y or 200,000+300 GHz=200,300 GHz. On the other hand, the left sideband modulation carrier suppression (−SSB-CS) performed by optical mixer 110 may involve mixing phase noise reduced self-injection locking signal SILS' with radio-frequency signal RFSIG while filtering out both the carrier at the frequency of phase noise reduced self-injection locking signal SILS' (e.g., F1+Y or 200,300 GHz) and the right sideband (at frequency (F1+Y)+Y or 200,300+300 GHz=200,600), leaving the left sideband to form modified self-injection locking signal SILS" at first optical frequency F1 (200,000 GHz).

In this way, optical mixer 110 may frequency shift phase noise reduced self-injection locking signal SILS' back to the frequency of primary laser 90 (as modified self-injection locking signal SILS"). Optical path 116 may provide modified self-injection locking signal SILS" to primary laser 90. Primary laser 90 may be self-injection locked using modified self-injection locking signal SILS" (e.g., in one or more iterations or loops around self-injection locking loop 114). Once primary laser 90 has been self-injection locked, secondary laser 92 may be self-injection locked using phase noise reduced self-injection locking signal SILS'. This may configure fluctuations (e.g., phase variations) in secondary laser 92 and thus second optical local oscillator signal LO2 to tightly follow any fluctuations (e.g., phase variations) in primary laser 90 and thus primary optical local oscillator signal LO1, thereby configuring the separation in frequency and phase between primary optical local oscillator signal LO1 and secondary optical local oscillator signal LO2 to be constant over time. This may serve to allow the components clocked using optical local oscillator signals LO1 and LO2 to exhibit extremely stable performance over time (e.g., insensitive to phase noise and jitter) without the use of an external reference oscillator.

The example of FIG. 8 is illustrative and non-limiting. If desired, one or more phase-locked loops (PLLs) and/or frequency locked-loops (FLLs) (not shown) may be coupled around one or both lasers to further lock optical local oscillator signals LO1 and LO2 together (e.g., to perform coarse and then fine laser tuning until the clocking circuitry is locked). While described herein as lasers, primary laser 90 and secondary laser 92 may be any desired light sources/emitters. Lasers 90 and 92 may form LO light sources 70 of FIG. 7 and/or may respectively form LO light sources 70A and 70B of FIG. 7, for example. Primary laser 90 may sometimes also be referred to as a leader laser whereas secondary laser 92 is sometimes also referred to as a follower laser.

Figure 9:
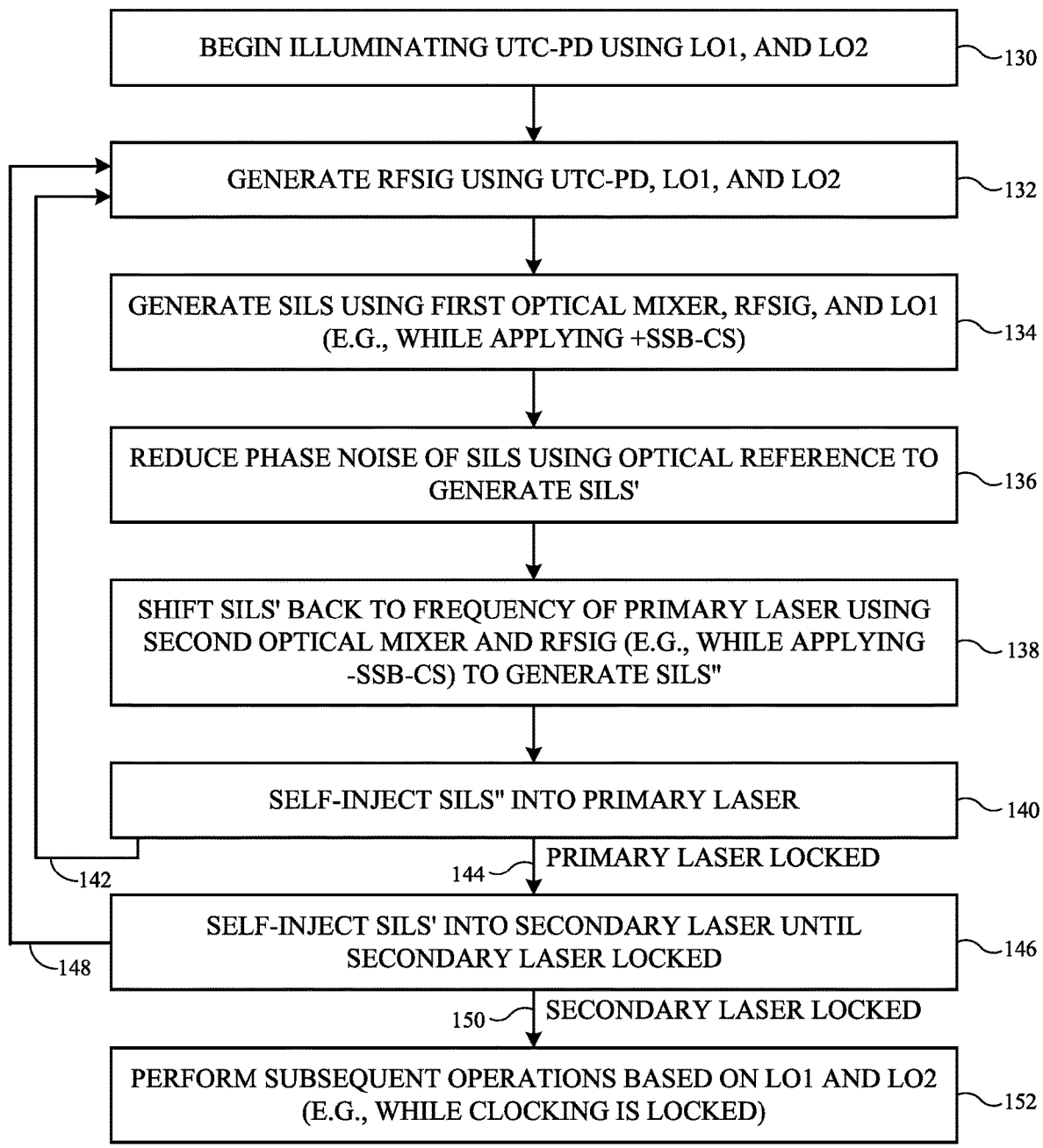
FIG. 9 is a flow chart of illustrative operations for self-injection locking a first light source and then a second light source in clocking circuitry having an optical reference in accordance with some embodiments.

FIG. 9 is a flow chart of illustrative operations involved in using clocking circuitry 75 to generate optical local oscillator signals LO1 and LO2 that are free from phase noise (e.g., for clocking one or more components in device 10 such as wireless circuitry 24 of FIG. 1)

At operation 130, primary laser 90 may begin to illuminate UTC PD 96 using first optical local oscillator signal LO1 over optical path 94. Secondary laser 92 may begin to concurrently illuminate UTC PD 96 using second optical local oscillator signal LO2 over optical path 118.

At operation 132, UTC PD 96 may generate (produce) radio-frequency signal RFSIG using (based on) optical local oscillator signals LO1 and LO2 (e.g., by heterodyning the optical local oscillator signals). UTC PD 96 may transmit radio-frequency signal RFSIG to optical mixer 110 over radio-frequency path 98 and to optical mixer 102 over radio-frequency path 100.

At operation 134, optical mixer 102 may generate self-injection locking signal SILS using (based on) first optical local oscillator signal LO1 and radio-frequency signal RFSIG (e.g., by electrically modulating or mixing first optical local oscillator signal LO1 with radio-frequency signal RFSIG). If desired, optical mixer 102 may perform a first SSB-CS operation on optical local oscillator signal LO1 and radio-frequency signal RFSIG such as right sideband modulation carrier suppression (+SSB-CS). This may serve to filter out both the carrier (at the first optical frequency F1 of optical local oscillator signal LO1) and the left sideband (at a frequency equal to F1 minus the frequency Y of radio-frequency signal RFSIG), forming self-injection locking signal SILS from the remaining right sideband (at a frequency equal to F1 plus the frequency Y of radio-frequency signal RFSIG). Optical mixer 102 may transmit self-injection locking signal SILS to optical reference 106 over optical path 104.

At operation 136, optical reference 106 may reduce the phase noise of self-injection locking signal SILS to generate phase noise reduced self-injection locking signal SILS' (e.g., by allowing the photons of self-injection locking signals SILS to circulate, resonate, or remain within optical reference 106 in a manner that increases photon lifetime, increases quality factor, and/or reduces the phase noise of the photons). Optical reference 106 may transmit phase noise reduced self-injection locking signal SILS' to secondary laser 92 and optical mixer 110 over optical path 104.

At operation 138, optical mixer 110 may shift the frequency of phase noise reduced self-injection locking signal SILS' back to the frequency of primary laser LO1 based on (using) radio-frequency signal RFSIG (e.g., by electrically modulating or mixing phase noise reduced self-injection locking signal SILS' with radio-frequency signal RFSIG) to generate modified self-injection locking signal SILS" for self-injection locking primary laser 90. If desired, optical mixer 110 may perform a second SSB-CS operation on noise reduced self-injection locking signal SILS' and radio-frequency signal RFSIG (e.g., opposite to the first SSB-CS operation performed by optical mixer 102). The second SSB-CS operation may be a left sideband modulation carrier suppression (−SSB-CS), for example. This may serve to filter out both the carrier (at frequency F1+Y) and the right sideband (at frequency (F1+Y)+Y), forming modified self-injection locking signal SILS" from the remaining left sideband (at a frequency equal to (F1+Y)−Y=F1, which is the first optical frequency of primary laser 90). Optical mixer 110 may transmit modified self-injection locking signal SILS" to primary laser 90 over optical path 116.

At operation 140, optical path 116 may self-inject primary laser 90 using modified self-injection locking signal SILS". Primary laser 90 may, for example, include a laser cavity between two mirrors that keep photons within the laser cavity. If no self-injection is performed, both mirrors are 100% reflective. However, when self-injection is performed, one of the mirrors is less than 100% reflective, allowing the modified self-injection locking signal SILS" (e.g., an optical signal ostensibly at the same frequency as first optical local oscillator signal LO1) to be transmitted into the laser cavity from optical path 116 through the mirror. The self-injected photons from modified self-injection locking signal SILS" have been cleaned (de-correlated) of phase noise by optical reference 106 and may therefore help primary laser 90 to output first optical local oscillator signal LO1 with reduced phase noise. Processing may loop back to operation 132 via path 142 to perform multiple iterations of self-injection locking on primary laser 90 until primary laser 90 is locked (e.g., exhibits sufficiently low phase noise).

Once primary laser 90 has been locked (e.g., self-injection locked), processing may proceed from operation 140 to operation 146 via path 144. At this point, first optical local oscillator signal LO1 has been cleaned of phase noise and the self-injection locking signal SILS (and thus the phase noise reduced self-injection locking signal SILS') produced using the cleaned first optical local oscillator signal LO1 is locked to primary laser 90. Optical path 104 may then self-inject secondary laser 92 using phase noise reduced self-injection locking signal SILS'. Secondary laser 92 may, for example, include a laser cavity between two mirrors that keep photons within the laser cavity. If no self-injection is performed, both mirrors are 100% reflective. However, when self-injection is performed, one of the mirrors is less than 100% reflective, allowing the phase noise reduced self-injection locking signal SILS' (e.g., an optical signal at the same frequency as second optical local oscillator signal LO2 (F2=F1+Y)) to be transmitted into the laser cavity from optical path 104 through the mirror. The self-injected photons from phase noise reduced self-injection locking signal SILS' have been cleaned (de-correlated) of phase noise by optical reference 106 and have been locked to primary laser 90, which therefore helps second laser 92 to output second optical local oscillator signal LO2 having reduced phase noise in a manner that is locked with first optical local oscillator signal LO1. Processing may loop back to operation 132 via path 148 to perform multiple iterations of self-injection locking on secondary laser 92 until secondary laser 92 is locked (e.g., exhibits sufficiently low phase noise).

Once secondary laser 92 is locked, secondary laser 92 is locked to primary laser 90 and clocking circuitry 75 itself is locked. Processing then may proceed to operation 152 via path 150. Clocking circuitry 75 may clock one or more processing operations in device 10 using optical local oscillator signals LO1 and LO2 (e.g., device 10 may perform subsequent processing operations as clocked by optical local oscillator signals LO1 and LO2). For example, the UTC PDs 42 in device 10 may transmit and/or receive THF signals using the optical local oscillator signals LO1 and LO2 produced by clocking circuitry 75 with minimal phase noise and jitter. Since optical local oscillator signals LO1 and LO2 have been locked together, any subsequent phase variations in first optical local oscillator signal LO1 will therefore be matched by corresponding phase variations in second optical local oscillator signal LO2, thereby minimizing phase noise and allowing the optical local oscillator signals LO1 and LO2 to be used for clocking purposes that are stable and consistent over time (e.g., allowing the optical local oscillator signals to be heterodyned on a UTC PD for the transmission and/or reception of THF signals such that the phase of the THF signals remains steady over time).

Figure 10:
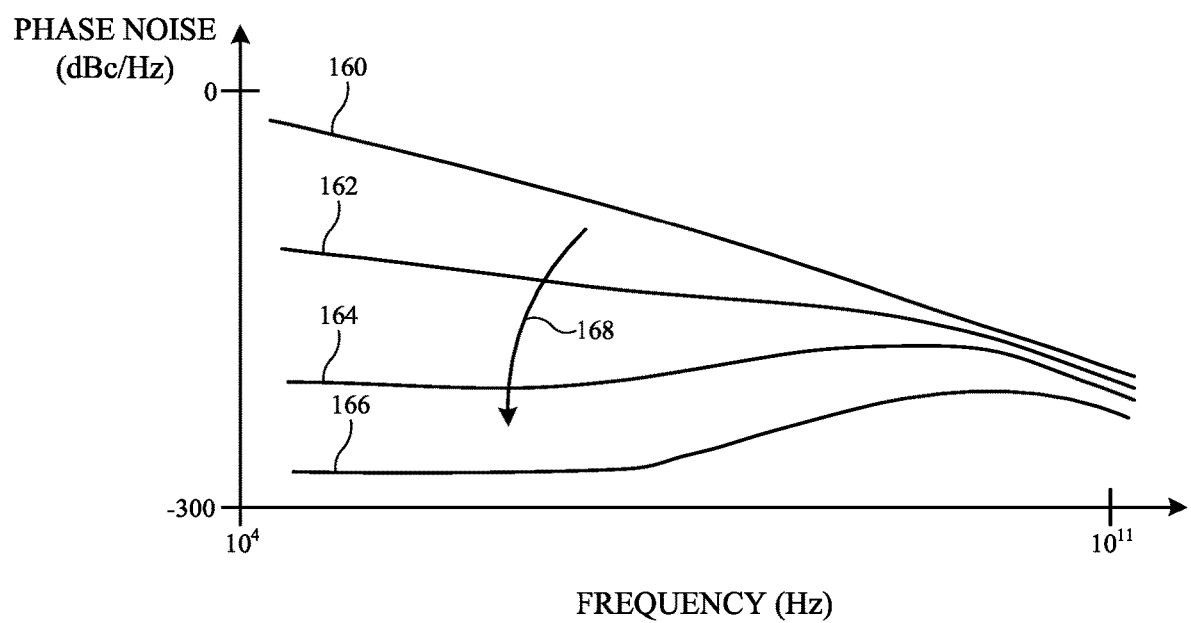
FIG. 10 is a plot of phase noise as a function of frequency showing how illustrative clocking circuitry having an optical reference may minimize phase noise using self-injection locking in accordance with some embodiments.

FIG. 10 is a plot showing how clocking circuitry 75 may reduce phase noise using self-injection locking loops 114 and 112 having optical reference 106. The horizontal axis of FIG. 10 plots frequency (e.g., in Hz on a logarithmic scale). The vertical axis of FIG. 10 plots phase noise (e.g., in dBc/Hz). Curve 160 plots the general (abstracted) trend in phase noise of clocking circuitry 75 (e.g., the phase noise of both optical local oscillator signals LO1 and LO2, which may specifically have separate values lying on opposing sides of curve 160) prior to any iterations of the self-injection locking operations of FIG. 9. Curve 162 plots the general (abstracted) trend in phase noise of clocking circuitry 75 after one iteration of the self-injection locking operations of FIG. 9. Curve 164 plots the general (abstracted) trend in phase noise of clocking circuitry 75 after two iterations of the self-injection locking operations of FIG. 9. Curve 166 plots the general (abstracted) trend in phase noise of clocking circuitry 75 after three iterations of the self-injection locking operations of FIG. 9. As shown by curves 160-166, the self-injection locking operations serve to reduce phase noise after a sufficient number of iterations, as shown by arrow 168. Curves 160-166 may have other shapes in practice.

Figure 11:
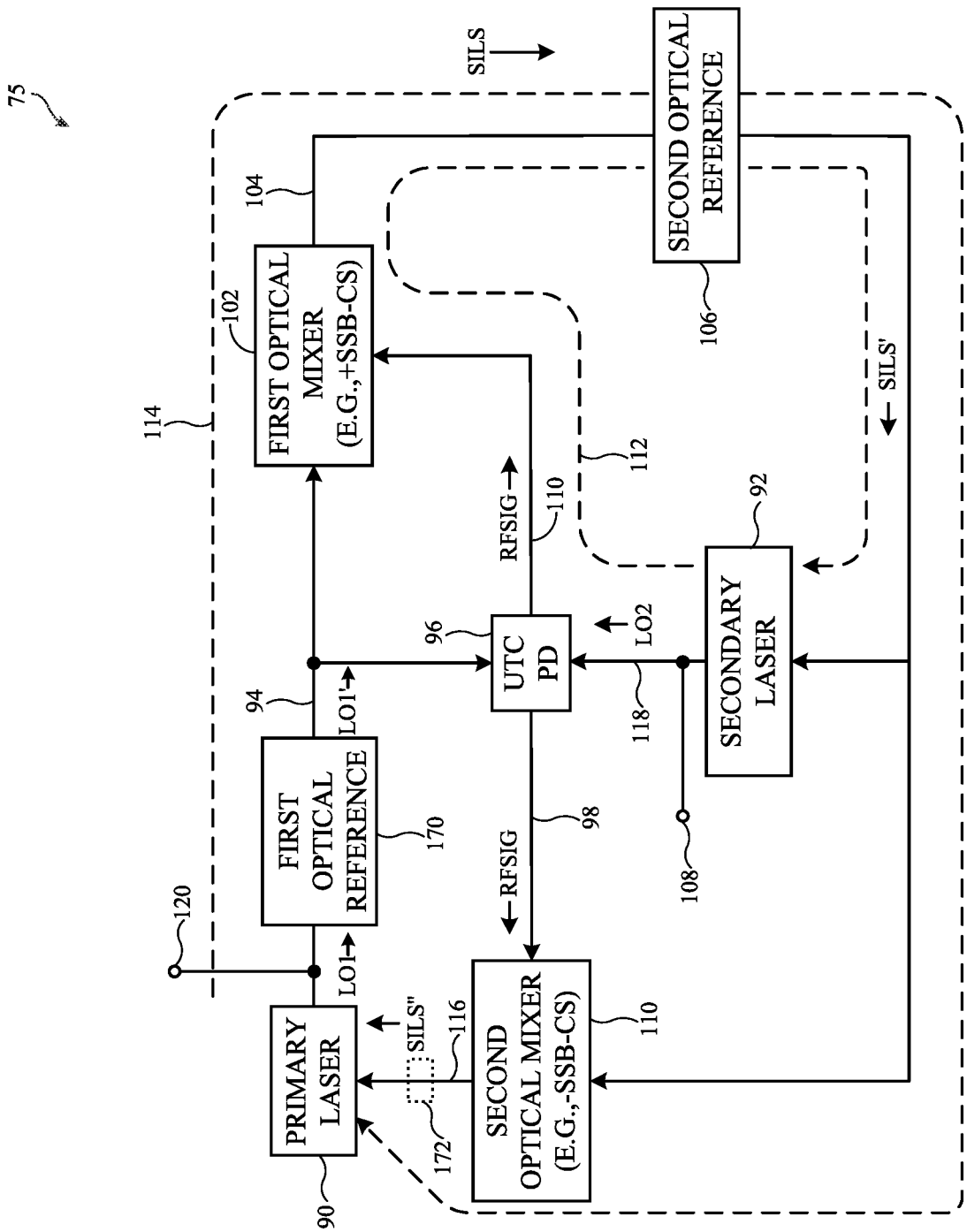
FIG. 11 is a circuit diagram of illustrative clocking circuitry having first and second light sources that perform self-injection locking using first and second optical references to minimize phase noise in accordance with some embodiments.

In the example of FIG. 9, clocking circuitry 75 includes a single optical reference 106. If desired, clocking circuitry 75 may include two optical references (e.g., dual optical references). FIG. 11 is a circuit diagram showing one example of how clocking circuitry 75 may include two optical references. As shown in FIG. 11, clocking circuitry 75 may include a first optical reference 170 disposed on optical path 94. Optical reference 106 on optical path 104 therefore forms a second optical reference of clocking circuitry 75 in this example.

Optical reference 170 may receive first optical local oscillator signal LO1 from primary laser 90 (e.g., over a first portion of optical path 94 coupled to output terminal 120).

Optical reference 170 may generate phase noise reduced first optical local oscillator signal LO1' using (based on) first optical local oscillator signal LO1. Optical reference 170 may transmit phase noise reduced first optical local oscillator signal LO1' to first optical mixer 102 and UTC PD 96 over a second portion of optical path 94. Optical reference 170 may include optical components that remove, clean, and/or reduce phase noise of optical signals (photons) received at its input over optical path 94. Optical reference 170 may include, for example, an optical delay line, an optical resonator, and/or other optical components.

This example is illustrative and, in other implementations, optical reference 170 may be disposed on optical path 116 (e.g., at location 172) and may reduce the phase noise of modified self-injection locking signal SILS" prior to self-injecting primary laser 90. In general, optical reference 106 may be disposed on (form a part of) both self-injection locking loops 112 and 114 whereas optical reference 170 is disposed on (forms a part of) only self-injection locking loop 114 (but not self-injection locking loop 112). This may, for example, allow primary laser 90 and secondary laser 92 to self-injection lock at the same time rather than first self-injection locking primary laser 90 and then self-injection locking secondary laser 92.

Figure 12:
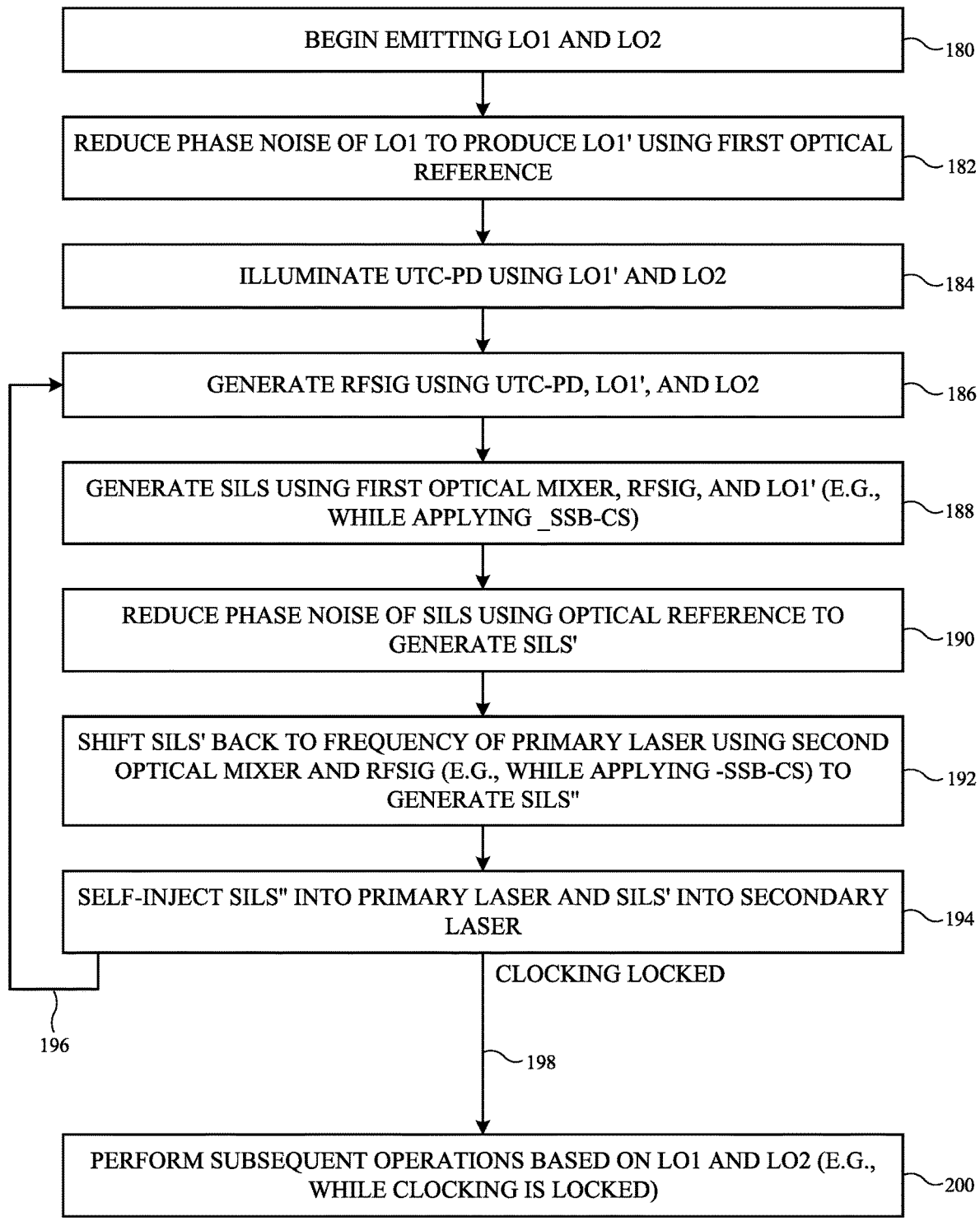
FIG. 12 is a flow chart of illustrative operations for concurrently self-injection locking first and second first light sources in clocking circuitry having first and second optical references in accordance with some embodiments.

FIG. 12 is a flow chart of illustrative operations involved in using clocking circuitry 75 having optical references 106 and 170 (FIG. 11) to generate optical local oscillator signals LO1 and LO2 that are free from phase noise.

At operation 180, primary laser 90 may begin to emit first optical local oscillator signal LO1 on optical path 94. Secondary laser 92 may begin to emit second optical local oscillator signal LO2 on optical path 118.

At operation 182, optical reference 170 may reduce the phase noise of first optical local oscillator signal LO1 to generate phase noise reduced first optical local oscillator signal LO1' (e.g., by allowing the photons of first optical local oscillator signal LO1 to circulate, resonate, or remain within optical reference 106 in a manner that increases photon lifetime, increases quality factor, and/or reduces the phase noise of the photons). Optical reference 170 may transmit phase noise reduced first optical local oscillator signal LO1' to UTC PD 96 and optical mixer 102 over optical path 94.

At operation 184, optical path 94 may illuminate UTC PD 96 using phase noise reduced first optical local oscillator signal LO1'. Optical path 118 may concurrently illuminate UTC PD 96 using second optical local oscillator signal LO2.

At operation 186, UTC PD 96 may generate (produce) radio-frequency signal RFSIG using (based on) optical phase noise reduced first local oscillator signal LO1 and second optical local oscillator signal LO2 (e.g., by heterodyning the optical local oscillator signals). UTC PD 96 may transmit radio-frequency signal RFSIG to optical mixer 110 over radio-frequency path 98 and to optical mixer 102 over radio-frequency path 100.

At operation 188, optical mixer 102 may generate self-injection locking signal SILS using (based on) phase noise reduced first optical local oscillator signal LO1' and radio-frequency signal RFSIG (e.g., by electrically modulating or mixing phase noise reduced first optical local oscillator signal LO1' with radio-frequency signal RFSIG). If desired, optical mixer 102 may perform a first SSB-CS operation on phase noise reduced optical local oscillator signal LO1' and radio-frequency signal RFSIG such as right sideband modulation carrier suppression (+SSB-CS). Optical mixer 102 may transmit self-injection locking signal SILS to optical reference 106 over optical path 104.

At operation 190, optical reference 106 may reduce the phase noise of self-injection locking signal SILS to generate phase noise reduced self-injection locking signal SILS' (e.g., by allowing the photons of self-injection locking signals SILS to circulate, resonate, or remain within optical reference 106 in a manner that increases photon lifetime, increases quality factor, and/or reduces the phase noise of the photons). Optical reference 106 may transmit phase noise reduced self-injection locking signal SILS' to secondary laser 92 and optical mixer 110 over optical path 104.

At operation 192, optical mixer 110 may shift the frequency of phase noise reduced self-injection locking signal SILS' back to the frequency of primary laser LO1 based on (using) radio-frequency signal RFSIG (e.g., by electrically modulating or mixing phase noise reduced self-injection locking signal SILS' with radio-frequency signal RFSIG) to generate modified self-injection locking signal SILS" for self-injection locking primary laser 90. If desired, optical mixer 110 may perform a second SSB-CS operation on noise reduced self-injection locking signal SILS' and radio-frequency signal RFSIG (e.g., opposite to the first SSB-CS operation performed by optical mixer 102). The second SSB-CS operation may be a left sideband modulation carrier suppression (−SSB-CS), for example. Optical mixer 110 may transmit modified self-injection locking signal SILS" to primary laser 90 over optical path 116.

At operation 194, optical path 116 may self-inject primary laser 90 using modified self-injection locking signal SILS". Optical path 104 may concurrently self-inject secondary laser 92 using phase noise reduced self-injection locking signal SILS'. Since first optical local oscillator signal LO1 and second optical local oscillator signal LO2 are both phase noise reduced during each iteration of self-injection locking loops 112 and 114 in this example, primary laser 90 and secondary laser 92 may be concurrently self-injection locked and thus locked to each other without requiring primary laser 90 to be self-injection locked before secondary laser 92 is then self-injection locked. Processing may loop back to operation 186 via path 196 to perform multiple iterations of self-injection locking on primary laser 90 and secondary laser 92 until primary laser 90 and secondary laser 92 are locked and thus locked to each other.

Once primary laser 90 has been locked and secondary laser 92 has been locked, processing may proceed from operation 194 to operation 200 via path 198. Clocking circuitry 75 may clock one or more processing operations in device 10 using optical local oscillator signals LO1 and LO2 (e.g., device 10 may perform subsequent processing operations as clocked by optical local oscillator signals LO1 and LO2). For example, the UTC PDs 42 in device 10 may transmit and/or receive THF signals using the optical local oscillator signals LO1 and LO2 produced by clocking circuitry 75 with minimal phase noise and jitter. Since optical local oscillator signals LO1 and LO2 have been locked together, any subsequent phase variations in first optical local oscillator signal LO1 will therefore be matched by corresponding phase variations in second optical local oscillator signal LO2, allowing the optical local oscillator signals LO1 and LO2 to be used for clocking purposes that are stable and consistent over time (e.g., allowing the optical local oscillator signals to be heterodyned on a UTC PD for the transmission and/or reception of THF signals such that the phase of the THF signals remains steady over time). The operations of FIG. 12 may be modified accordingly in implementations where optical reference 170 is disposed at location 172 of FIG. 11.

Figure 13:
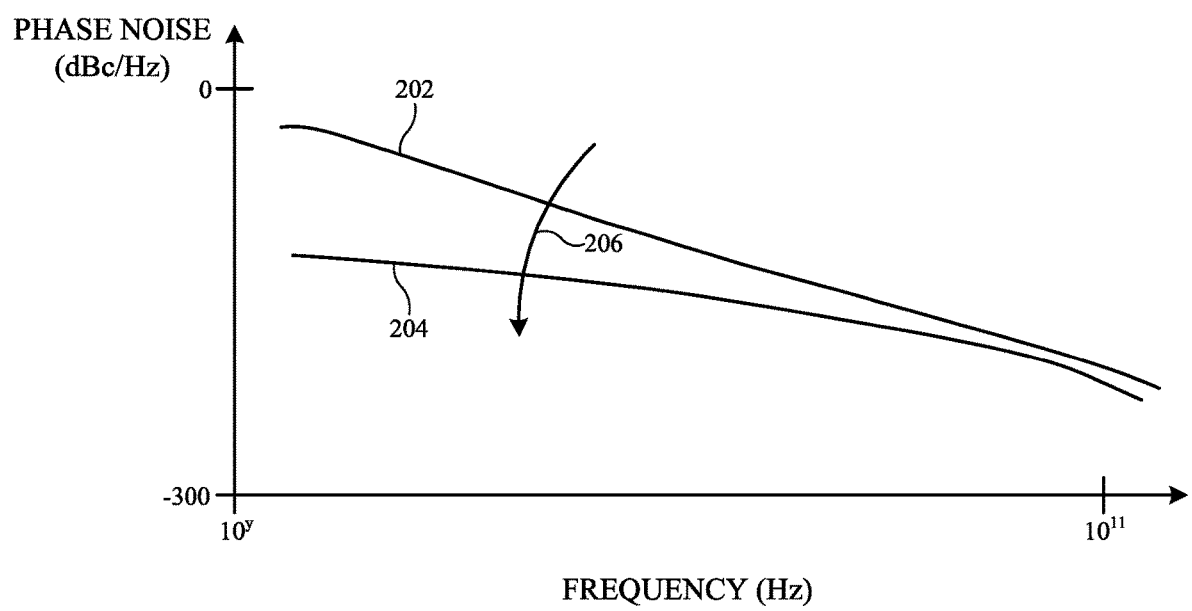
FIG. 13 is a plot of phase noise as a function of frequency showing how illustrative clocking circuitry having first and second optical references may minimize phase noise using self-injection locking in accordance with some embodiments.

FIG. 13 is a plot showing how clocking circuitry 75 may reduce phase noise when self-injection locking loop 114 includes optical references 170 and 106 and self-injection locking loop 112 includes optical reference 106 but not optical reference 170 (e.g., as shown in FIG. 11). The horizontal axis of FIG. 13 plots frequency (e.g., in Hz on a logarithmic scale). The vertical axis of FIG. 13 plots phase noise (e.g., in dBc/Hz). Curve 202 plots the general (abstracted) trend in phase noise of clocking circuitry (e.g., the phase noise of both optical local oscillator signals LO1 and LO2, which may specifically have separate values lying on opposing sides of curve 160) prior to any iterations of the self-injection locking operations of FIG. 12. Curve 204 plots the general (abstracted) trend in phase noise of clocking circuitry 75 after one or more iterations of the self-injection locking operations of FIG. 12. As shown by curves 202 and 204, the self-injection locking operations serve to reduce phase noise, as shown by arrow 206. Curves 202 and 204 may have other shapes in practice.

The optical components described herein (e.g., MZM modulator(s), waveguide(s), phase shifter(s), UTC PD(s), etc.) may be implemented in or using plasmonics technology if desired. For example, the optical mixers described herein (e.g., MZM 58 of FIG. 6, optical mixer 102 of FIGS. 8 and 11, optical mixer 110 of FIGS. 8 and 11, etc.) may be plasmonic-based optical modulators.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-13 (e.g., the operations of FIGS. 9 and 12) may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. Clocking circuitry comprising:
   a first light source configured to generate a first optical local oscillator (LO) signal at a first frequency;
   a second light source configured to generate a second optical LO signal at a second frequency;
   a photodiode configured to be illuminated by the first optical LO signal and the second optical LO signal;
   a mixer having a first input coupled to the first light source and a second input coupled to the photodiode;
   an optical path that couples an output of the optical mixer to an input of the second light source; and
   an optical reference disposed on the optical path.

2. The clocking circuitry of claim 1, wherein the optical reference comprises an optical delay line.

3. The clocking circuitry of claim 1, wherein the optical reference comprises an optical resonator.

4. The clocking circuitry of claim 1, further comprising:
   an additional mixer having a third input coupled to the optical path, a fourth input coupled to the photodiode, and an output coupled to an input of the first light source.

5. The clocking circuitry of claim 4, wherein the photodiode is configured to generate a radio-frequency signal based on the first optical LO signal and the second optical LO signal and is configured to transmit the radio-frequency signal to the second input of the mixer and to the fourth input of the additional mixer.

6. The clocking circuitry of claim 5, wherein the mixer comprises a first electro-optical mixer and the additional mixer comprises a second electro-optical mixer.

7. The clocking circuitry of claim 6, wherein the first electro-optical mixer comprises first Mach-Zehnder modulator (MZM) and the second electro-optical mixer comprises a second MZM.

8. The clocking circuitry of claim 6, wherein the first electro-optical mixer is configured to generate a first optical signal on the optical path by mixing the radio-frequency signal with first optical LO signal while filtering out a first carrier and a left sideband of the first carrier.

9. The clocking circuitry of claim 8, wherein the second electro-optical mixer is configured to generate a second optical signal at its output by mixing the radio-frequency signal with the first optical signal while filtering out a second carrier and a right sideband of the second carrier.

10. The clocking circuitry of claim 9, wherein the second frequency is separated from the first frequency by a frequency offset, the radio-frequency signal has a frequency equal to the frequency offset, the first optical signal has the second frequency, and the second optical signal has the first frequency.

11. The clocking circuitry of claim 10, wherein the optical path is configured to self-injection lock the second light source using the first optical signal and the second electro-optical mixer is configured to self-injection lock the first light source using the second optical signal.

12. The clocking circuitry of claim 4, further comprising:
   an additional optical path that couples the output of the additional optical reference to the input of the first light source; and
   an additional optical reference disposed on the additional optical path.

13. The clocking circuitry of claim 1, further comprising:
   an additional optical path that couples an output of the first light source to the first input of the mixer; and
   an additional optical reference disposed on the additional optical path.

14. Clocking circuitry comprising:
   a first laser configured to generate a first optical local oscillator (LO) signal;
   a second laser configured to generate a second optical LO signal;
   a first self-injection locking loop path coupled around the first laser and configured to self-injection lock the first laser;
   a second self-injection locking loop path coupled around the second laser and configured to self-injection lock the second laser;
   an optical reference that forms a part of both the first self-injection locking loop path and the second self-injection locking loop path; and
   an electro-optical mixer that forms part of both the first self-injection locking loop path and the second self-injection locking loop path.

15. The clocking circuitry of claim 14, wherein the optical reference comprises an optical delay line.

16. The clocking circuitry of claim 14, wherein the optical reference comprises an optical resonator.

17. The clocking circuitry of claim 14, further comprising:
   an additional optical reference that forms part of the first self-injection locking loop path but not part of the second self-injection locking loop path.

18. The clocking circuitry of claim 14, further comprising:
   a photodiode configured to generate a radio-frequency signal based on the first optical LO signal and the second optical LO signal, wherein the electro-optical mixer has a first input coupled to the first laser and a second input coupled to the photodiode, the electro-optical mixer being configured to generate a first optical signal based on the radio-frequency signal and the first optical LO signal; and
   an additional electro-optical mixer having a first input coupled to the photodiode, an output coupled to an input of the first laser, and a second input; and
   an optical path that couples an output of the electro-optical mixer to the second input of the additional electro-optical mixer, wherein the additional electro-optical mixer is configured to generate a second optical signal based on the radio-frequency signal and the first optical signal, the optical reference is disposed on the optical path, the first self-injection locking loop path includes the optical path, the optical reference, and the additional electro-optical mixer, and the second self-injection locking loop path includes the photodiode, the optical reference, and a portion of the optical path.

19. An electronic device comprising:
   a first laser configured to emit a first optical local oscillator (LO) signal;
   a second laser configured to emit a second optical LO signal;

an antenna configured to convey radio-frequency signals based on the first optical LO signal and the second optical LO signal;

a photodiode configured to be illuminated by the first optical LO signal and the second optical LO signal;

a first loop path coupled between an output of the first laser and an input of the first laser;

a second loop path coupled between an output of the second laser and an input of the second laser, the photodiode being disposed on the second loop path;

a first mixer disposed on the first loop path and the second loop path;

a second mixer disposed on the first loop path; and an optical reference disposed on the first loop path between the first mixer and the second mixer and on the second loop path between the first mixer and the second laser.

20. The electronic device of claim 19, wherein the first mixer has a first input coupled to an output of the first laser, a second input coupled to the photodiode, and an output coupled to an input of the optical reference, the second mixer has a third input coupled to an output of the optical reference, a fourth input coupled to the photodiode, and an output coupled to an input of the first laser, and the output of the optical reference is coupled to an input of the second laser.

* * * * *